(12) United States Patent
Samuelsson et al.

(10) Patent No.: US 10,404,987 B2
(45) Date of Patent: Sep. 3, 2019

(54) LAYER SWITCHING IN VIDEO CODING

(71) Applicant: Telefonaktiebolaget L M Ericsson (publ), Stockholm (SE)

(72) Inventors: Jonatan Samuelsson, Stockholm (SE); Jack Enhorn, Kista (SE); Rickard Sjöberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 488 days.

(21) Appl. No.: 14/390,154

(22) PCT Filed: Aug. 6, 2014

(86) PCT No.: PCT/SE2014/050917
§ 371 (c)(1),
(2) Date: Oct. 2, 2014

(87) PCT Pub. No.: WO2015/053680
PCT Pub. Date: Apr. 16, 2015

(65) Prior Publication Data
US 2016/0353115 A1      Dec. 1, 2016

Related U.S. Application Data

(60) Provisional application No. 61/889,812, filed on Oct. 11, 2013.

(51) Int. Cl.
*H04N 19/159* (2014.01)
*H04N 19/597* (2014.01)
(Continued)

(52) U.S. Cl.
CPC ......... *H04N 19/159* (2014.11); *H04N 19/132* (2014.11); *H04N 19/156* (2014.11);
(Continued)

(58) Field of Classification Search
CPC .. H04N 19/159; H04N 19/172; H04N 19/132; H04N 19/156; H04N 19/162;
(Continued)

(56) References Cited

U.S. PATENT DOCUMENTS

2015/0016500 A1\*   1/2015  Seregin ............... H04N 19/70
                                                                    375/240.02
2016/0044309 A1\*   2/2016  Choi .................... H04N 19/50
                                                                    375/240.12

OTHER PUBLICATIONS

Meeting report of the 14th meeting of the Joint Collaborative Team on Video Coding (JCT-VC), Vienna, AT, Jul. 25-Aug. 2, 2013, Gary Sullivan, Document: JCTVC-N_Notes_d8.\*
(Continued)

*Primary Examiner* — Anner N Holder
*Assistant Examiner* — Hesham K Abouzahra
(74) *Attorney, Agent, or Firm* — Sage Patent Group

(57) ABSTRACT

A multi-layer or multi-view video is encoded by encoding one of a picture in a first layer or view and a picture in a second layer or view coinciding at a switching point defining a switch between the first layer or view and the second layer or view. The other of the picture in the first layer or view and the picture in the second layer or view coinciding at the switching point is encoded as a skip picture. The embodiments thereby reduce complexity of encoding and decoding multi-layer or multi-view video having a switching point and reduce the number of bits required for representing encoded pictures coinciding at the switching point.

32 Claims, 9 Drawing Sheets

(51) Int. Cl.

| | |
|---|---|
| *H04N 19/70* | (2014.01) |
| *H04N 19/172* | (2014.01) |
| *H04N 19/30* | (2014.01) |
| *H04N 19/132* | (2014.01) |
| *H04N 19/156* | (2014.01) |
| *H04N 19/162* | (2014.01) |
| *H04N 19/164* | (2014.01) |
| *H04N 19/39* | (2014.01) |

(52) U.S. Cl.
CPC ......... *H04N 19/162* (2014.11); *H04N 19/164* (2014.11); *H04N 19/172* (2014.11); *H04N 19/30* (2014.11); *H04N 19/39* (2014.11); *H04N 19/597* (2014.11); *H04N 19/70* (2014.11)

(58) Field of Classification Search
CPC ...... H04N 19/164; H04N 19/30; H04N 19/39; H04N 19/597; H04N 19/70
See application file for complete search history.

(56) References Cited

OTHER PUBLICATIONS

Adaptive resolution change with SHVC, Kemal Ugur; Hoda Roodaki-Lavasani; Miska M. Hannuksela, Jan. 14-23, 2013, Joint Collaborative Team on Video Coding (JCT-VC) of ITU-T SG 16 WP 3 and ISO/IEC JTC 1/SC 29/WG 11, Document: JCTVC-L0119.*

SHVC skipped picture indication, Jill Boyce; Vidyo; Xiaoyu Xiu; Yong He; Yan Ye, Jul. 24-Aug. 2, 2013, Joint Collaborative Team on Video Coding (JCT-VC) of ITU-T SG 16 WP 3 and ISO/IEC JTC 1/SC 29/WG 11, Document: JCTVC-N0209.*

Adaptive resolution change with SHVC, Kemal Ugur; Hoda Roodaki-Lavasani; Miska M. Hannuksela, Jan. 14-23, 2013, Joint Collaborative Team on Video Coding (JCT-VC) of ITU-T SG 16 WP 3 and ISO/IEC JTC 1/SC 29/WG 11, Document: JCTVC-L0119 (Year: 2013).*

SHVC skipped picture indication, Jill Boyce; Vidyo; Xiaoyu Xiu; Yong He; Yan Ye, Jul. 24-Aug. 2, 2013, Joint Collaborative Team on Video Coding (JCT-VC) of ITU-T SG 16 WP 3 and ISO/IEC JTC 1/SC 29/WG 11, Document: JCTVC-N0209 (Year: 2013).*

Meeting report of the 14th meeting of the Joint Collaborative Team on Video Coding (JCT-VC), Vienna, AT, Jul. 25-Aug. 2, 2013, Gary Sullivan, Document: JCTVC-N_Notes_d8 (Year: 2013).*

International Preliminary Report on Patentability, Application No. PCT/SE2014/050917, dated Jan. 18, 2016.

International Search Report for International Application No. PCT/SE2014/050917 dated Jan. 7, 2015, 6 pages.

Written Opinion of the International Searching Authority for International Application No. PCT/SE2014/050917 dated Jan. 7, 2015, 10 pages.

Ugur et al: "Adaptive resolution change with SHVC" Joint Collaborative Team on Video Coding (JCT-VC) of ITU-T SG 16 WP 3 and ISO/IEC JTC 1/SC 29/WG 11 $12^{th}$ Meeting: Geneva, CH, Jan. 14-23, 2013; Document: JCTVC-L0119; 3 pages.

Boyce et al: "SHVC HLS: SHVC Skipped Picture Indication", Joint Collaborative Team on Video Coding (JCT-VC) of ITU-T SG 16 WP 3 and ISO/IEC JTC 1/SC 29/WG 11 $14^{th}$ Meeting: Vienna, AT Jul. 24-Aug. 2, 2013; Document: JCTVC-N0209; 4 pages.

Roodaki et al: "Efficient video resolution adaptation using scalable H.265/HEVC", 2013 IEEE International Conference on Image Processing, IEEE, Sep. 15, 2013, pp. 1563-1567, XP032565550.

Chen et al: "SHVC Test Model 2", Joint Collaborative Team on Video Coding (JCT-VC) of ITU-T SG 16 WP3 and ISO/IEC JTC1/SC29/WG11 $13^{th}$ Meeting: Incheon, KE, Apr. 18-26, 2013; Document: JCTVC-M1007_v1; 22 pages.

Sjoberg et al: "Overview of HEVC high-level syntax and reference picture management" IEEE Transactions on Circuits and Systems for Video Technology, Jan. 1, 2012, 7 pages.

Samuelsson et al: "SHVC skip pictures" Joint Collaborative Team on Video Coding (JCT-VC) of ITU-T SG 16 WP 3 and ISO/IEC JTC 1/SC 29/WG 11 $15^{th}$ Meeting: Geneva, CH, Oct. 23-Nov. 1, 2013; Document: JCTVC-O0199 m 30969; 4 pages.

Chen et al: "High efficiency video coding (HEVC) scalable extension Draft 4", Joint Collaborative Team on Video Coding (JCT-VC) of ITU-T SG 16 WP 3 and ISO/IEC JTC 1/SC 29/WG 11 $15^{th}$ Meeting: Geneva, CH, Oct. 23-Nov. 1, 2013, Document: JCTVC-O1008_v1; 38 pages.

ITU-T H.265, "Series H: Audivisual and Multimedia Systems, Infrastructure of audiovisual services—Coding of moving video; High efficiency video coding"; Recommendation ITU-T H.265; International Telecommunication Union; Telecommunication Standardization sector of ITU; Apr. 2013; 317 pages.

Samuelsson et al: "SHVC skip pictures" Joint Collaborative Team on Video Coding (JCT-VC) of ITU-T SG 16 WP 3 and ISO/IEC JTC 1/SC 29/WG 11, $15^{th}$ Meeting: Geneva, CH, Oct. 23-Nov. 1, 2013; Document: JCTVC-O0199 m 30969; Retrieved Oct. 31, 2013, 5 pages.

* cited by examiner

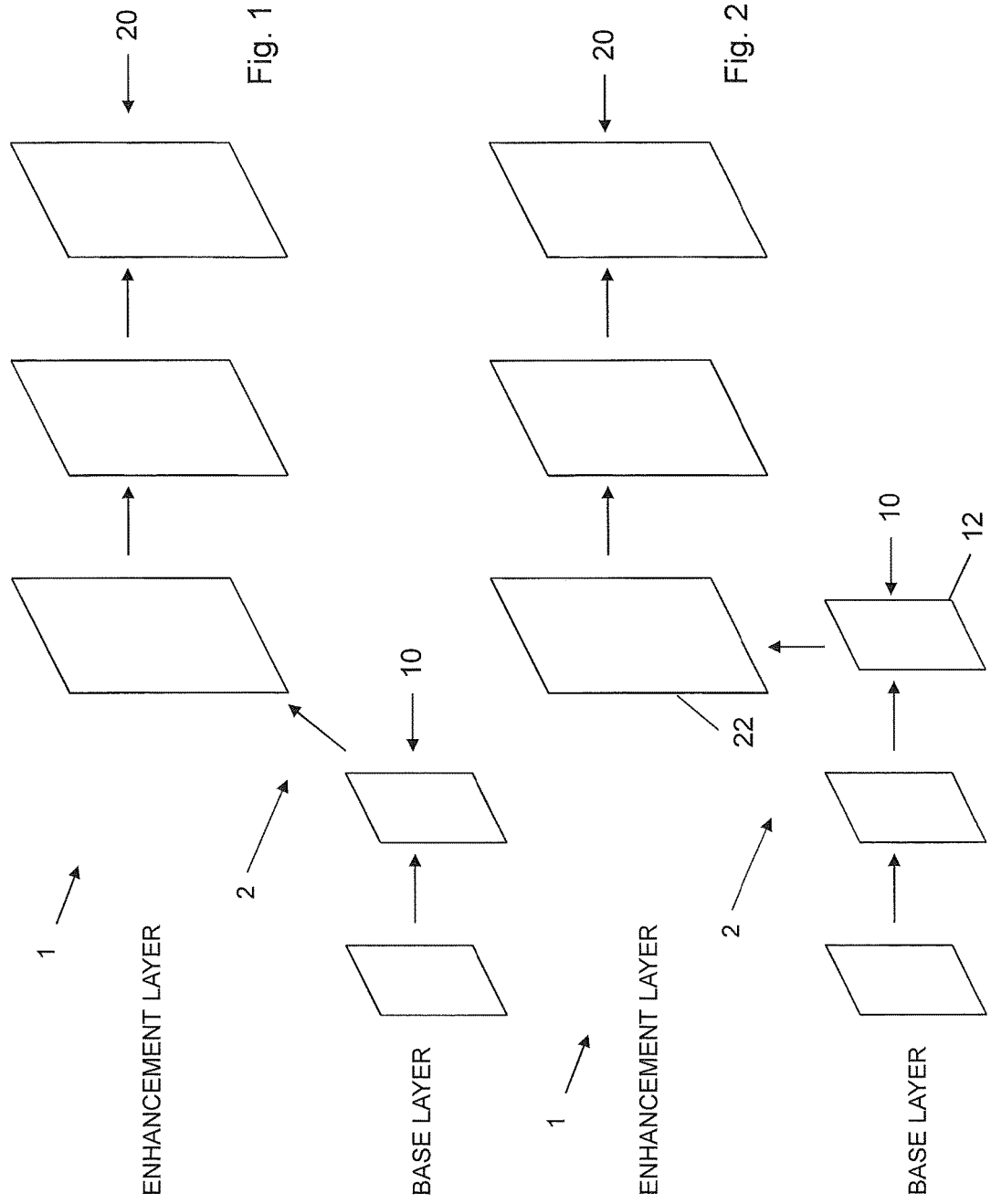

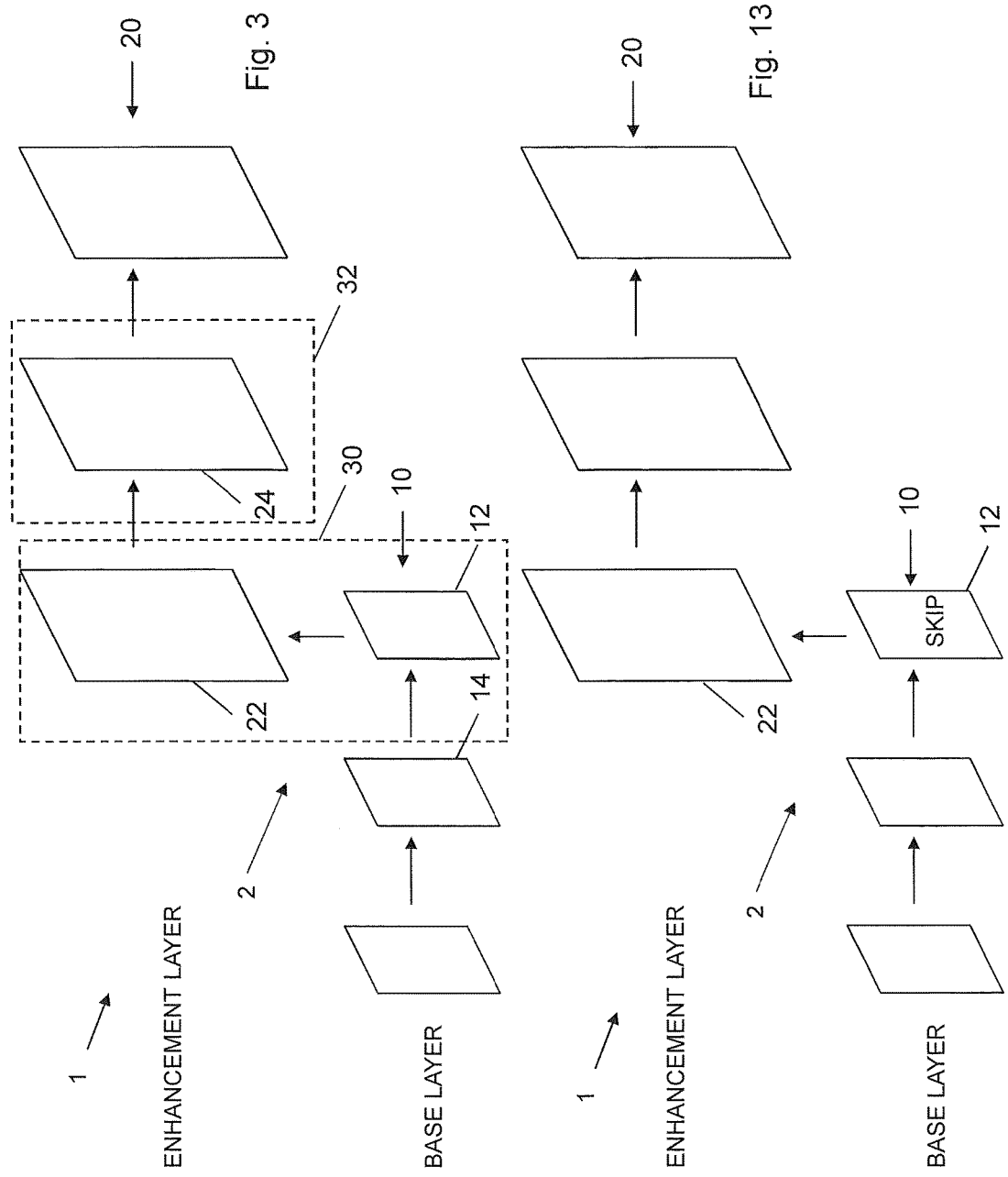

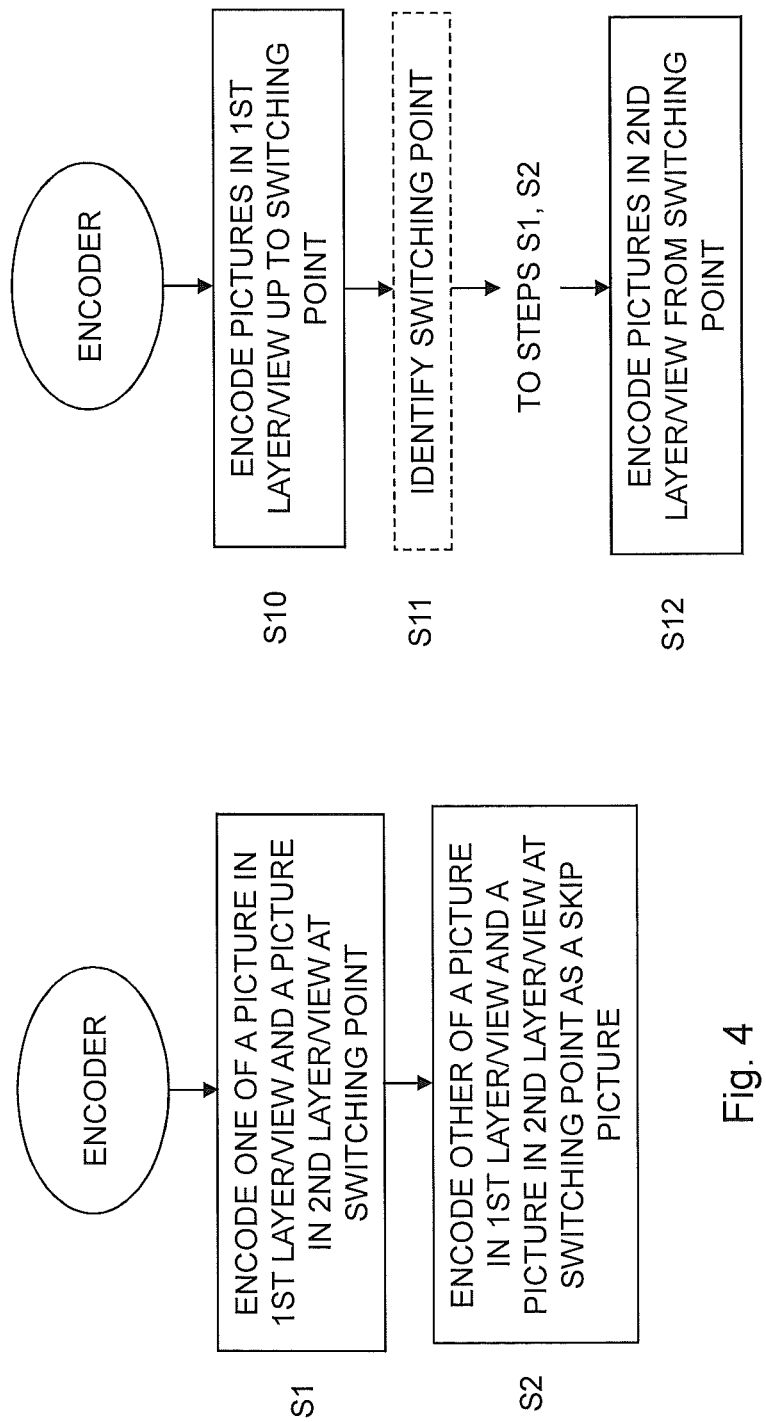

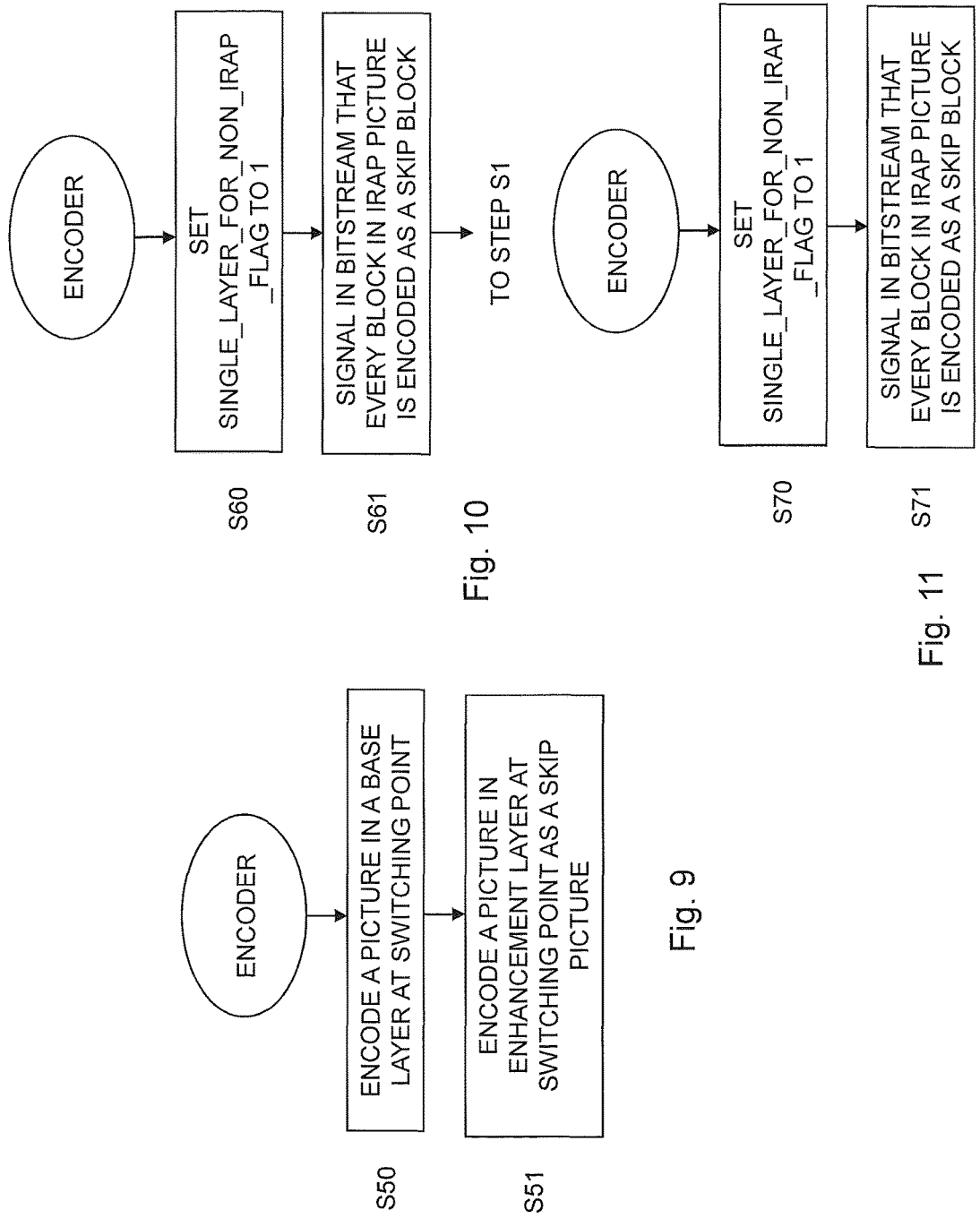

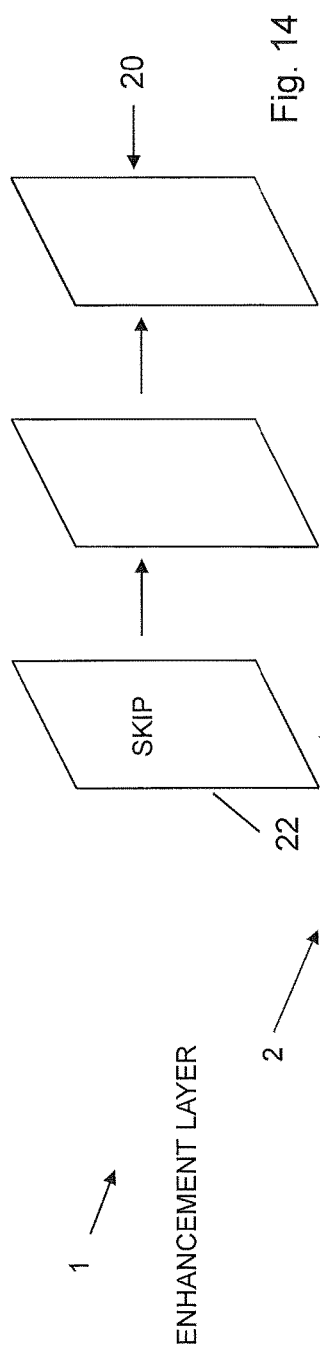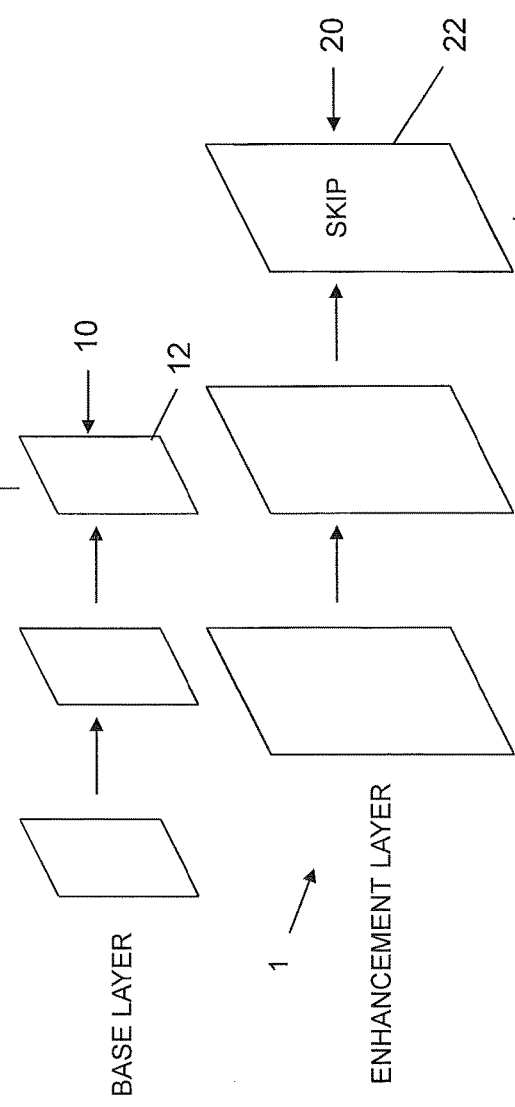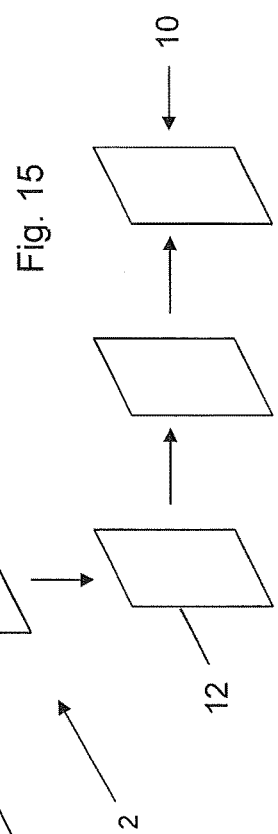

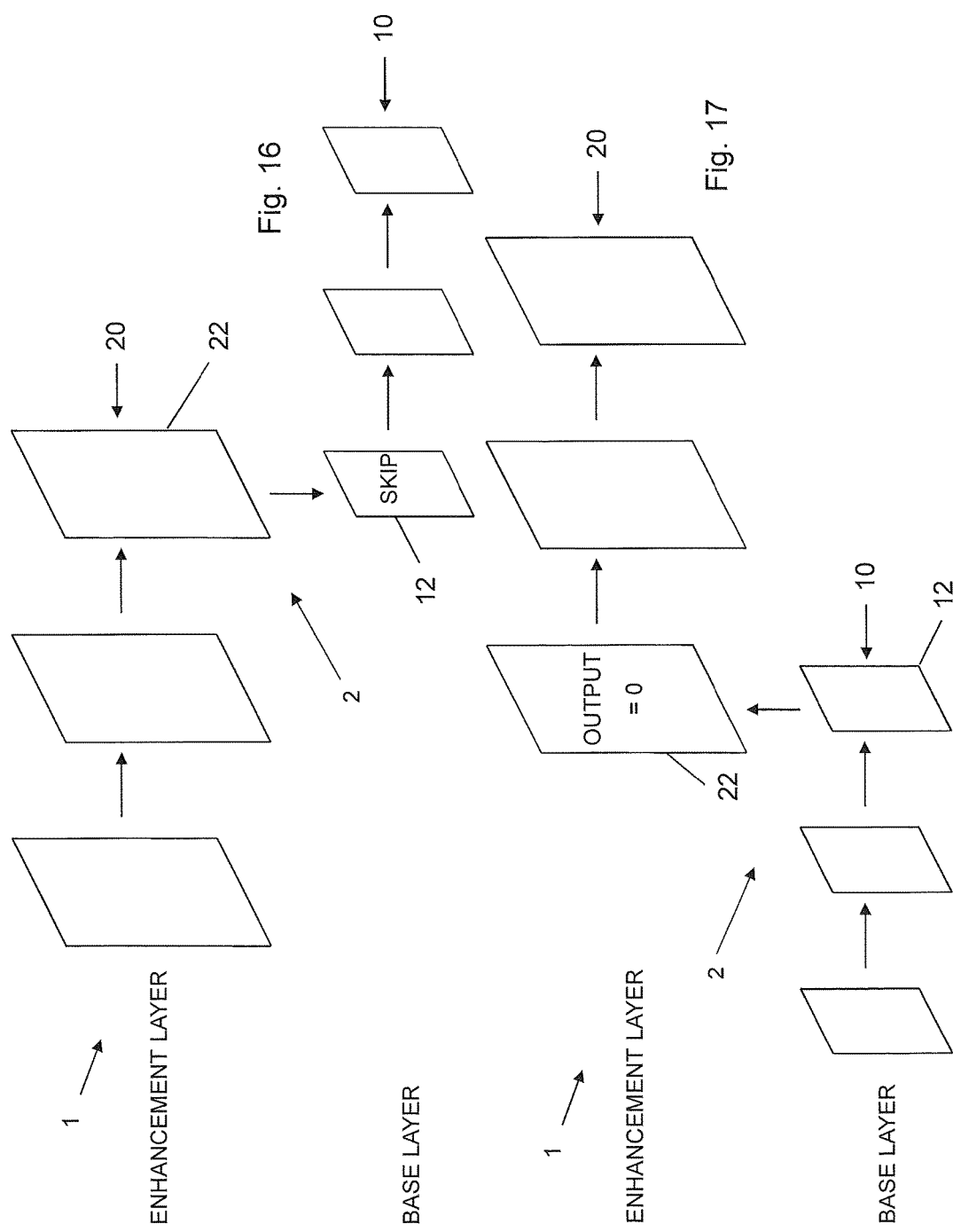

LAYER SWITCHING IN VIDEO CODING

CROSS REFERENCE TO RELATED APPLICATION

This application is a 35 U.S.C. § 371 national stage application of PCT International Application No. PCT/SE2014/050917, filed in the English language on 6 Aug. 2014, which itself claims the benefit of U.S. provisional Patent Application No. 61/889,812, filed 11 Oct. 2013, the disclosures and contents of both of which are incorporated by reference herein in their entirety.

TECHNICAL FIELD

The embodiments generally relate to encoding of multi-layer or multi-view video and in particular to encoding pictures of such multi-layer or multi-view video coinciding at a switching point in the multi-layer or multi-view video.

BACKGROUND

High Efficiency Video Coding (HEVC, ITU-T H.265|ISO/IEC 23008-2) is a recent video coding standard developed in Joint Collaborative Team-Video Coding (JCT-VC), a collaborative project between Moving Pictures Experts Group (MPEG) and International Telecommunication Unit (ITU) Telecommunication Standardization Sector (ITU-T). HEVC uses a block based hybrid scheme that exploits spatial (Intra) prediction and temporal (Inter) prediction. The first picture of a video sequence is encoded using Intra prediction only, i.e. an Intra picture, since there is no temporal reference available.

A basic concept in video encoding and decoding is to compress and decompress video data of a video sequence or stream by exploiting spatial and temporal redundancy in the video data. Generally, blocks of pixels, also denoted samples in the art, are encoded and decoded relative to reference blocks of pixels within a same picture (intra prediction) or (an)other picture(s) (inter prediction) of the video sequence. For instance, HEVC specifies 33 directional modes, planar and DC intra prediction modes for intra prediction. The intra prediction modes use data from neighboring prediction blocks, i.e. blocks of pixels, which have been previously decoded. Inter prediction may use data from one or more prediction blocks in (an)other picture(s). These reference blocks are typically identified by a respective motion vector (MV). HEVC allows for two MV modes which are Advanced Motion Vector Prediction (AMVP) and merge mode. AMVP uses data from the reference picture and can also use data from adjacent prediction blocks. The merge mode allows for the MVs to be inherited from neighboring prediction blocks. The difference between the current block of pixels and the reference block of pixels is then encoded and used, together with representation of intra prediction mode or MV data, as encoded representation of the block of pixels. The resulting encoded bitstream output from the encoder is then decoded at the decoder to get decoded representations of the pictures in the video sequence or stream.

An extension of HEVC is a scalable extension (SHVC) that allows for a single encoded bitstream to contain different versions of the same video with different resolutions and/or quality. Prediction between the layers is allowed in order to improve coding efficiency compared to sending the different versions of the video as independent streams. A special use case of scalable video coding is Adaptive Resolution Change (ARC) using the layers to create an adaptive video bitstream. When the resolution needs to be changed, the adaptive video coder switches to a layer with a resolution that is suitable for the current network conditions, and continues the coding. Resolution change can also be done within one layer and in the non-scalable version of HEVC but for that case, each time the resolution is changed, it is required that an Intra picture is used, which reduces coding efficiency.

Each encoded picture in an SHVC stream is associated with a Picture Order Count (POC) value representing the output order of pictures. A picture with a higher POC value is output later than a picture with a lower POC value. In SHVC there can be pictures from different layers with the same POC value, which are said to belong to the same Access Unit (AU). This typically means that they represent different versions of the same original image, e.g. one full resolution and one down-sampled, and that if they are output they will be output at the same time. When more than one picture is signaled in the same AU they must belong to different layers, i.e. have different layer identifiers nuh_layer_id.

The lowest layer in a scalable bitstream is called the base layer and has layer identifier zero. Higher layers are called enhancement layers and have layer identifiers larger than zero. In SHVC, Intra Random Access Point (IRAP) pictures in enhancement layers are a type of picture that do not reference any pictures of the enhancement layer. However, reference to the base layer is allowed. The IRAP pictures also prohibit pictures that follow the IRAP picture in decoding order to reference pictures that precede the IRAP picture in decoding order.

In typical SHVC streams there are pictures in all layers in every AU, at every time instance, but in the case of ARC the encoder would typically chose to set the single_layer_for_non_irap_flag equal to 1. single_layer_for_non_irap_flag equal to 1 indicates that there are at most two pictures in each AU, i.e. each time instance, and when there are two pictures in the same AU the one in the highest layer must be an IRAP picture.

When this flag is equal to one there is in general only one picture in each AU, either in the base layer or in an enhancement layer. The only exception is when the enhancement layer picture is signaled as an IRAP picture. In that AU it is allowed to have pictures in both base layer and enhancement layer(s). This means that the base layer picture can be used for prediction by the enhancement layer. It also means that the enhancement layer picture cannot reference any pictures in the enhancement layer since it is coded as an IRAP picture. Traversing from a lower layer to a higher is called up-switching. Respectively traversing to a lower layer is called down-switching.

In a typical case using SHVC for adaptive resolution change a prediction structure as shown in FIG. 1 would be favorable for a layer switch. The reason being that it is then sufficient to provide only a single picture at each time instance in the video. However, an IRAP picture is constrained to only contain intra prediction or inter-layer prediction from pictures with the same POC. This means that at a switching point 2, pictures 12, 22 must exist at both layers 10, 20, as shown in FIG. 2, in order not to restrict the IRAP to intra-only coding. When SHVC is used for adaptive resolution change, the decoder is typically intended to only output one of these pictures 12, 22. However, a straight-forward encoder implementation will not take this into consideration and encode both pictures 12, 22 at the switching point 2 as efficiently as possible, which will result in that bits are spent to encode details in a picture that will never be displayed. This redundant coding increases the size of the bitstream and adds to both encoding and decoding complexity.

SUMMARY

It is a general objective to provide an efficient encoding of multi-layer or multi-view video.

It is a particular objective to provide an efficient encoding of such multi-layer or multi-view video comprising a switching point defining a switch between different layers or views.

These and other objectives are met by embodiments as defined herein.

An aspect of the embodiments relates to a method for encoding multi-layer or multi-view video comprising multiple layers or views. The method comprises encoding one of a picture in a first layer or view and a picture in a second layer or view of the multi-layer or multi-view video coinciding at a switching point defining a switch between the first layer or view and the second layer or view in the multi-layer or multi-view video. The method also comprises encoding the other of the picture in the first layer or view and the picture in the second layer or view coinciding at the switching point as a skip picture.

A related aspect of the embodiments defines a multi-layer or multi-view encoder operable to encode one of a picture in a first layer or view and a picture in a second layer or view of a multi-layer or multi-view video coinciding at a switching point defining a switch between the first layer or view and the second layer or view in the multi-layer or multi-view video. The multi-layer or multi-view encoder is also operable to encode the other of the picture in the first layer or view and the picture in the second layer or view coinciding at the switching point as a skip picture.

Another related aspect of the embodiments defines a multi-layer or multi-view encoder comprising a first encoding unit operable to encode pictures in a first layer or view of a multi-layer or multi-view video comprising multiple layers or views up until a switching point defining a switch between the first layer or view and a second layer or view in the multi-layer or multi-view video. The multi-layer or multi-view encoder also comprises a unit operable to determine one of a picture in the first layer or view and a picture in the second layer or view coinciding at the switching point to be encoded as a skip picture. A second encoding unit is operable to encode the determined picture as a skip picture. The multi-layer or multi-view encoder further comprises an in/output unit operable to send an encoded bitstream corresponding to an encoded version of the multi-layer or multi-view video.

A further related aspect of the embodiments defines a multi-layer or multi-view encoder comprising a first encoding unit for encoding one of a picture in a first layer or view and a picture in a second layer or view of the multi-layer or multi-view video coinciding at a switching point defining a switch between the first layer or view and the second layer or view in the multi-layer or multi-view video. The multi-layer or multi-view encoder also comprises a second encoding unit for encoding the other of the picture in the first layer or view and the picture in the second layer or view coinciding at the switching point as a skip picture.

Another aspect of the embodiments relates to a method for encoding a multi-layer video in which each layer of the multi-layer video has a respective layer identifier. The method comprises setting a flag, single_layer_for_non_irap_flag, equal to 1 to indicate that there are at most two pictures in each access unit (AU) and when there are two pictures in a same AU the picture in a highest layer is an Intra Random Access Point (IRAP) picture. The method also comprises signaling, in an encoded bitstream corresponding to an encoded version of the multi-layer video, that every block of the IRAP picture is encoded as a skip block.

A related aspect of the embodiments defines a multi-layer video encoder for encoding a multi-layer video in which each layer of the multi-layer video has a respective layer identifier. The multi-layer video encoder is operable to set a flag, single_layer_for_non_irap_flag, equal to 1 to indicate that there are at most two pictures in each AU and when there are two pictures in a same AU the picture in a highest layer is an IRAP picture. The multi-layer video encoder is also operable to signal, in an encoded bitstream corresponding to an encoded version of the multi-layer video, that every block of the IRAP picture is encoded as a skip block.

Another related aspect of the embodiment defines a multi-layer video encoder for encoding a multi-layer video in which each layer of the multi-layer video has a respective layer identifier. The multi-layer video encoder comprises a flag setting unit operable to set a flag, single_layer_for_non_irap_flag, equal to 1 to indicate that there are at most two pictures in each AU and when there are two pictures in a same AU the picture in a highest layer is an IRAP picture. The multi-layer video encoder also comprises a signaling unit operable to signal, in an encoded bitstream corresponding to an encoded version of the multi-layer video, that every block of the IRAP picture is encoded as a skip block.

Yet another related aspect of the embodiment defines a multi-layer video encoder for encoding a multi-layer video in which each layer of the multi-layer video has a respective layer identifier. The multi-layer video encoder comprises a flag setting unit for setting a flag, single_layer_for_non_i-rap_flag, equal to 1 to indicate that there are at most two pictures in each AU and when there are two pictures in a same AU the picture in a highest layer is an IRAP picture. The multi-layer video encoder also comprises a signaling unit for signaling, in an encoded bitstream corresponding to an encoded version of the multi-layer video, that every block of the IRAP picture is encoded as a skip block.

A further aspect of the embodiments relates to a transmitting unit comprising a multi-layer or multi-view video encoder according to above.

Yet another aspect of the embodiments defines a computer program comprising code means which when executed by a processor causes the processor to encode one of a picture in a first layer or view and a picture in a second layer or view of the multi-layer or multi-view video coinciding at a switching point defining a switch between the first layer or view and the second layer or view in the multi-layer or multi-view video. The code means also causes the processor to encode the other of the picture in the first layer or view and the picture in the second layer or view coinciding at the switching point as a skip picture.

Another aspect of the embodiments defines a computer program comprising code means which when executed by a processor causes the processor to set a flag, single_layer_for_non_irap_flag, equal to 1 to indicate that there are at most two pictures in each AU and when there are two pictures in a same AU the picture in a highest layer is an IRAP picture. The code means also causes the processor to signal, in an encoded bitstream corresponding to an encoded version of the multi-layer video, that every block of the IRAP picture is encoded as a skip block.

The embodiments also encompass a computer program product comprising computer readable code means and a computer program according to above stored on the computer readable code means.

The embodiments provide an efficient multi-layer or multi-view video encoding by encoding at least one of the pictures coinciding at a switching point between different layers or views in the multi-layer or multi-view video as a skip picture. This significantly reduces the coding complexity at the switching point but also reduces the complexity during decoding. A further advantage of encoding one of the pictures at the switching point as a skip picture is that the number of bits required for signaling the encoded pictures coinciding at the switching point are generally reduced.

BRIEF DESCRIPTION OF THE DRAWINGS

The embodiments, together with further objects and advantages thereof, may best be understood by making reference to the following description taken together with the accompanying drawings, in which:

FIG. 1 illustrates forbidden prediction from a picture of lower POC value;

FIG. 2 illustrates legal predication at layer switch;

FIG. 3 schematically illustrates a switch point between different layers according to an embodiment;

FIG. 4 is a flow chart illustrating a method for encoding multi-layer or multi-view video according to an embodiment;

FIG. 5 is a flow chart illustrating additional, optional steps of the method shown in FIG. 4;

FIG. 9 is a flow chart illustrating a method for encoding multi-layer or multi-view video according to another embodiment;

FIG. 10 is a flow chart illustrating additional, optional steps of the method shown in FIG. 4;

FIG. 11 is a flow chart illustrating a method for encoding multi-layer or multi-view video according to a further embodiment;

FIG. 13 schematically illustrates up-switch with base layer picture skipped;

FIG. 14 schematically illustrates up-switch with enhancement layer picture skipped;

FIG. 15 schematically illustrates down-switch with enhancement layer picture skipped;

FIG. 16 schematically illustrates down-switch with base layer picture skipped;

FIG. 17 schematically illustrates up-switch without output of the first picture in the enhancement layer;

DETAILED DESCRIPTION

Figure 8:
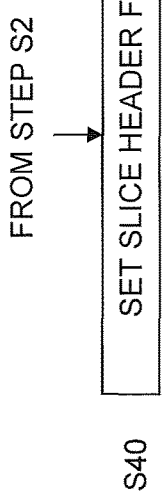
FIG. 8 is a flow chart illustrating an additional, optional step of the method shown in FIG. 4.

Throughout the drawings, the same reference numbers are used for similar or corresponding elements.

The present embodiments generally relate encoding multi-layer or multi-view video. In particular, the embodiments provide an efficient encoding of such multi-layer or multi-view video in connection with or coinciding at a switching point between layers or views in the multi-layer or multi-view video.

Generally, so called multi-layer video 1, also referred to scalable video in the art, such as obtained using the scalable extension of HEVC (SHVC), involves providing a scalable bitstream comprising multiple, i.e. at least two, layers 10, 20 of pictures 12, 14, 22, 24 as shown in FIG. 3. The lowest layer 10 in the scalable bitstream is denoted base layer and typically has layer identifier equal to zero. In a preferred embodiment, the pictures 12, 14 in the base layer 10 are encoded and decoded without reference to any pictures 22, 24 in other layers of the scalable bitstream. The other layer or layers 20 in the scalable bitstream is or are denoted enhancement layer or layers 20. An enhancement layer 20 typically has a non-zero layer identifier. Pictures 22, 24 within an enhancement layer 20 could be encoded and decoded with reference to pictures 22, 24 within the enhancement layer 20 and/or pictures 12 within a lower layer, such as a lower enhancement layer, i.e. having a lower layer identifier than the current enhancement layer 20, or the base layer 10.

Scalability can, for instance, represent scalability in resolution, i.e. providing different spatial resolutions in different layers 10, 20, or providing different temporal resolutions in different layers 10, 20. Alternatively, or in addition, scalability can represent scalability in quality. For instance, the different layers 10, 20 can be coded at a same spatial resolution but at different qualities. Related forms of scalability are typically denoted signal-to-noise ratio (SNR) scalability or fidelity scalability. It is also possible to have a combined scalability in terms of resolution scalability and quality scalability.

Multi-view video, such as obtained using 3D or multi-view extensions of HEVC, involves providing a video stream carrying video data of pictures present in different views. These different views can represent different cameras capturing a scene from slightly different camera or view angles or synthesized video from different views. In similarity to a scalable bitstream, one of the views of the multi-view video 1 could be regarded as a base view 10 in which the pictures 12, 14 are preferably encoded and decoded without reference to any pictures 22, 24 in other views 20. The pictures 22, 24 of a non-base view 20 can, however, be encoded and decoded by reference to pictures 22, 24 present in the non-base view 20 and/or to pictures 22, 24 present in another view, such as the base view 10.

The embodiments as disclosed herein can be applied to encoding multi-layer video and to encoding multi-view video. Multi-layer video and multi-view video could collectively be denoted multi-layer/-view video or indeed simply multi-layer video. In this latter case, multi-layer video is regarded as encompassing both scalable video with multiple base and enhancement layers and multi-view video with multiple views. However, herein the expression multi-layer or multi-view video is generally used to denote this type of video with pictures organized into different scalable layers or views.

FIG. 4 is a flow chart illustrating a method for encoding multi-layer or multi-view video 1 according to an embodiment. The method is preferably conducted by an encoder and preferably by a multi-layer or multi-view video encoder, sometimes denoted a scalable video codec or encoder or a multi-view codec or encoder, respectively. The method comprises encoding, in step S1, one of a picture 12 in a first layer or view 10 and a picture 22 in a second layer or view 20 of the multi-layer or multi-view video 1 coinciding at a switching point 2 defining a switch between the first layer or view 10 and the second layer or view 20 in the multi-layer or multi-view video 1. The method also comprises encoding, in step S2, the other of the picture 12 in the first layer or view 10 and the picture 22 in the second layer or view 20 coinciding at the switching point 2 as a skip picture.

Thus, the method as shown in FIG. 4 involves encoding pictures 12, 22 in at least two different layers or views 10, 20 and where these pictures 12, 22 coincide at a switching point 2. This switching point 2 defines, as shown in FIG. 3, a switch between the first layer or view 10 and the second layer or view 20. This switch could be from a lower layer or view 10 into a higher layer or view 20 as shown in FIG. 3. In such a case, the switch could be from a base layer or view 10 to an enhancement layer or view 20. Alternatively, the switch could be from an enhancement layer or view to a higher, such as having higher layer or view identifier, enhancement layer or view. However, it is also possible to have a switching from a higher layer or view to a lower layer or view, which is shown in FIGS. 15 and 16 and will be further discussed herein. The switch point 2 thereby corresponds to a switch of layers or views 10, 20 in the multi-layer or multi-view video 1.

The multi-layer or multi-view video 1 comprises both a picture 12 in the first layer or view 10 and a picture 22 in the second layer or view 20 at the switching point 2. Prior to and following this switching point 2, the multi-layer or multi-view video 1 may comprise pictures 14, 24 of only one of the layers or views 10, 20 as shown in FIG. 3.

In an embodiment, an access unit (AU) 30, 32 may be used to organize pictures in the multi-layer or multi-view video 1. In such a case, all pictures 12, 22 belonging to a same AU preferably have a same POC value representing the output order or the pictures. In a particular embodiment, all pictures 12, 22 belonging to the same AU are required to have the same POC value. The multi-layer or multi-view video 1 preferably only has AUs 30 with more than one picture 12, 22 at switching point 2. This means that AUs 32 prior to or following a switching point 2 typically only comprises a respective picture 24 from one layer or view 20.

Accordingly, one of the pictures 12, 22 coinciding at the switching point 2 between encoding one of the two layers or views 10, 20 and encoding the other of the two layers or views 10, 20 is encoded as a skip picture. Thus, at least one of the pictures 12, 22 coinciding at the switching points 2 will be encoded as a skip picture in step S2. The picture that is encoded in step S1 of FIG. 4 could also be encoded as a skip picture but does not have to be a skip picture. For instance, it could be encoded as an intra predicted picture (I picture) or an inter predicted picture (P or B picture).

As stated above, at the switching point 2 pictures 12, 22 from both layers or views 10, 20 are present in the bitstream. However, in most cases only one of these pictures 12, 22 will be used after decoding. This redundancy in pictures at the switching point 2 result in additional bits and complexity that should be minimized. According to the embodiments, at the switching point 2, the bitstream represents pictures 12, 22 from both layers or views 10, 20 and the encoder is configured to code one of the pictures 12, 22 at the switching point 2 as a skip picture in order to avoid the above mentioned redundancy.

Encoding a picture as a skip picture, sometimes also referred to as a skipped picture in the art, significantly reduces the complexity of encoding and decoding the picture. In addition, the number of bits required to represent a coded skip picture is much lower than the number of bits required to represent coded non-skip pictures, such as coded I, P or B pictures.

This differs from conventional techniques where each picture is encoded to be as close as possible to the original picture, using for example rate-distortion optimization, a fixed number or of bits or a fixed quality level.

Accordingly and in an embodiment, a picture in the bitstream signaled as a duplicate of a previous picture (without any additional pixel information) can be referred to as a skip or skipped picture. Currently, in HEVC a skip or skipped picture can, in an embodiment, be achieved by signaling at a block level that the samples, i.e. pixel values, shall be copied from an already decoded picture. There are different ways of signaling that a block shall copy sample values from the corresponding position in another picture, e.g. using inter-mode with zero motion vector and no residual or using merge mode. Herein any method or type of signaling that result in identical pixel values of a current picture and a reference picture is considered to be a "skip picture". In the SHVC case the picture that is used for reference might have a different resolution in which case the term "skip picture" refers, in an embodiment, to copying a resampled, typically up-scaled, version of the reference picture without changing any values, i.e. no residual coding.

The term "skip picture" can also, in an embodiment, include pictures and means to create them that does not result in that the produced picture is an exact copy of a previous picture. One example is when the skip or skipped picture is created by blending together samples from two previous pictures. Another example is when motion vectors from a previous picture are applied to a previous picture to create the current picture.

In this document the terms skip picture and a skipped picture are used to describe the same thing. A skip picture or skipped picture is, in an embodiment, a picture for which there is no low level information signaled that affects the result of the decoding, i.e. generation of samples, of the picture. In other words there is, in an embodiment, no block level information signaled that affects the decoding process, for example residual information or motion vectors. The entire picture is, in an embodiment, decoded based on high level information only, such as indication of which picture to copy sample values from or from to which picture a rescaling process shall be applied to generate the samples from.

Herein low level information refers, in an embodiment, to everything that is signaled at block level, e.g. Sample Adaptive Offset (SAO) values and prediction mode information. High level information refers, in an embodiment, to everything that is signaled on slice or picture level, e.g. deblocking parameters, weights for weighted prediction and tile configuration.

Generally, a picture in HEVC, SHVC and multi-view video coding is defined as an array of luminescence (luma) samples in monochrome format or an array of luminescence (luma) samples and two corresponding arrays of chroma samples in, for instance, 4:2:0, 4:2:2, and 4:4:4 color format. Hence, reference to a sample or pixel and a sample value or pixel value as used herein could refer to a luma or chroma sample and a luma or chroma value, respectively. Hence, the luma and chroma samples can also be referred to as pixel values or pixel data.

In an embodiment, step S2 of FIG. 4 comprises encoding the other of the picture 12 in the first layer or view 10 and the picture 22 in the second layer or view 20 coinciding at the switching point 2 as a skip picture indicating that sample values are to be copied from a previous, according to an encoding and decoding order, picture 12 of the multi-layer or multi-view video 1 or that resampled versions of the sample values are to be used.

Thus, in a particular embodiment, encoding a picture as a skip picture comprises indicating that the sample values of the skip picture are to be copied from a previous picture in the multi-layer or multi-view video. In FIG. 3, the arrows between the pictures 12, 14, 22, 24 indicate the encoding and decoding order. Hence, the picture 24 is encoded and decoded based on the previous picture 22. Correspondingly, the picture 12 is encoded and decoded based on the previous picture 14. In this particular embodiment, the skip picture is thereby a direct copy of the previous picture and both these pictures will have identical sample values.

Note that the previous picture according to the encoding and decoding order could be present in a same layer or view as a current picture to be encoded as a skip picture or in another layer or view.

In another particular embodiment, encoding a picture as a skip picture comprises indicating that resampled versions, such as up-scaled or down-scaled versions, of the sample values of a previous picture are used in the skip picture. Hence, in this particular embodiment, the skip picture is a resampled version, such as up-scaled or down-scaled version, of the previous picture if the two pictures are of different resolutions. The resampling of the sample values is preferably done without changing the values, i.e. preferably does not involve any residual coding. As is well known in the art, residual encoding involves encoding a difference between sample values in a current picture and sample values of or obtained from a reference picture. For instance, copying up-scaled sample values could involve assigning sample value at pixel position (x,y)=(i,j) from the previous picture to pixel positions (x,y)=(i,j), (i+1,j), (i,j+1), (i+1,j+1) in the skip picture if the resolution of the skip picture is twice that of the previous picture.

Thus, in an embodiment encoding a picture as a skip picture indicates that sample values or resampled versions of sample values are to be derived from a previous, according to the encoding and decoding order, picture of the multi-layer or multi-view video.

In another embodiment, step S2 of FIG. 4 comprises encoding the other of the picture 12 in the first layer or view 10 and the picture 22 in the second layer or view 20 coinciding at the switching point 2 as a skip picture using a merge mode of HEVC or an extension of HEVC, such as a scalable, 3D or multi-view extension of HEVC.

The merge mode of HEVC indicates that the motion vectors to be inherited from neighboring prediction units or blocks. Hence, encoding a prediction unit using merge mode have the advantage that no motion estimation procedure needs to be performed for the prediction unit in order to obtain the motion vectors of the prediction unit. In clear contrast, the motion vectors are inherited from already encoded prediction units.

In a further embodiment, step S2 of FIG. 4 comprises encoding the other of the picture 12 in the first layer or view 10 and the picture 22 in the second layer or view 20 coinciding at the switching point 2 as a skip picture lacking motion information and residual information. Hence, no motion vectors or residual needs to be determined for the prediction units of the skip picture. In an embodiment, the motion vectors could be inferred to be zero motion vectors. Alternatively, the motion vectors are inferred from previous, according to the encoding and decoding order, prediction units as indicated above for the merge mode.

Yet another embodiment of step S2 in FIG. 4 comprises encoding the other of the picture 12 in the first layer or view 10 and the picture 22 in the second layer or view 20 coinciding at the switching point as a skip picture indicating that there is no block level information signaled that affects the decoding process for the skip picture. Such block level information generally refers to residual information and motion vectors, i.e. motion information.

A further embodiment of step S2 in FIG. 4 comprises encoding the other of the picture 12 in the first layer or view 10 and the picture 22 in the second layer or view 20 coinciding at the switching point as a skip picture indicating to which previous, according to an encoding and decoding order, picture(s) a rescaling process shall be applied to generate sample values of the skip pictures.

The above presented embodiments basically indicate the same thing. Thus, a skip picture is encoded without any motion estimation procedure or calculating any coding residuals, which significantly simplifies the encoding process and also the decoding process. In addition, the amount of data needed to signal the encoded picture is significantly reduced by encoding the picture as a skip picture.

Whereas the picture encoded in step S2 of FIG. 4 is encoded as a skip picture, the picture encoded in step S1 of FIG. 4 can be encoded with conventional techniques. For instance, the picture could be encoded to get an encoded picture that, when decoded, result in a decoded picture that is as close as possible as the original picture. This means that the picture encoded in step S1 could be encoded using, for example, rate-distortion optimization, a fixed number of bits or a fixed quality level.

There are several techniques for encoding a picture as efficiently as possible but they are typically based on trying to make the reconstructed (encoded) picture look as similar as possible as the original (uncompressed) picture with as few bits as possible. Normally there are side constrains on complexity, maximum bitrate and/or minimum quality level. The techniques include, but are not limited to, using a fixed or constant number of bits, using a fixed or constant quality level or using rate-distortion optimization. Rate-distortion optimization means that the encoder tries to minimize a weighted sum of the bitrate and the distortion, i.e. how much the reconstructed picture differs from the original picture.

An embodiment of step S1 therefore comprises encoding the one of the picture 12 in the first layer or view 10 and the picture 22 in the second layer or view 20 coinciding at the switching point 2 using at least one of rate-distortion optimization, a fixed number of bits and a fixed quality level.

Generally, the expression "rate-distortion optimization" collectively refers to methods of compression performed by an encoder that takes into account both the quality, i.e. distortion, and the size of the encoded data, i.e, rate. Within video compression, the quality (distortion) is typically evaluated on the resulting sample values but there are also methods for measuring quality (distortion) on transformed samples, e.g. transform coefficients.

The distortion metric could be, but is not limited to, a full-reference model where encoded and reconstructed sample values are compared to the original sample values using, for instance, sum of absolute differences (SAD), sum of squared differences (SSD) or structural similarity (SSIM). Alternatively, it could be a no-reference model were encoded sample values are evaluated using heuristics or complexity metrics. A further alternative could be a combination of both full-reference and no-reference models.

The rate could, for example, be measured in terms of number of bits or an approximation thereof, or number of binary arithmetic coders (bins) or an approximation thereof.

A special case of rate-distortion optimization is the so-called Lagrange optimization, where the encoder tries to minimize the sum of distortion (D) and lambda or Lagrange multiplier ($\lambda$) times rate (R), i.e. arg_min(D+$\lambda$R). The Lagrange multiplier is selected to balance the trade-off between distortion and rate. Lagrange optimization is typically performed at block level, for example, for mode selection, e.g. intra mode vs. inter mode, for motion vector selection, and/or for transform coefficient selection.

Hence, rate-distortion optimization as used herein indicates an encoding by taking into account or basing at least one of its decision during encoding both on expected, approximated or indeed actual distortion and expected, approximated or indeed actual rate.

Encoding using a fixed number of bits typically involves encoding the picture to achieve highest possible quality, e.g, lowest possible distortion, but using a fixed number of bits or no more than this fixed number of bits for encoding the picture. Correspondingly, encoding using a fixed quality level typically involves encoding the picture to achieve the lowest possible rate, such as lowest number of bits, but using a fixed quality level, e.g. fixed distortion level, or a quality higher than the fixed quality level, e.g. a distortion level lower than the fixed distortion level.

It could be possible to use at least two of rate-distortion optimization, fixed number of bits and fixed quality level when encoding a picture in step S1. For instance, the encoding as performed in step S1 could comprise encoding the picture using both a fixed (maximum) number of bits and a fixed (minimum) quality level.

In a particular embodiment, step S1 comprises encoding the picture 12 in the first layer or view 10 and the picture 22 in the second layer or view 20 coinciding at the switching point 2 using an encoder compliant with ITU-T H.265, April 2013, SERIES H: AUDIVISUAL AND MULTIMEDIA SYSTEMS, Infrastructure of audiovisual services—Coding of moving video, High efficiency video coding, and/or an encoder compliant with an extension of this HEVC standard, in particular a scalable extension of HEVC, a 3D extension of HEVC and/or a multi-view extension of HEVC.

FIG. 5 is a flow chart illustrating additional, optional steps of the method as shown in FIG. 4. Step S10 comprises encoding pictures 14 in the first layer or view 10 up to the switching point 2. The encoding as performed of the pictures 14 in the first layer or view 10 preceding, according to the encoding and decoding order, the picture 12 coinciding at the switching point 2 is typically performed as discussed above for step S1, i.e. preferably using at least one of rate-distortion optimization, a fixed number of bits and a fixed quality level.

If the first layer or view 10 is a base layer or view 10 as shown in FIG. 3, then the encoding in step S10 preferably comprises encoding the pictures 14 using intra or inter mode with reference pictures selected among previous, according to the encoding and decoding order, pictures within the base layer or view 10. If the first layer or view instead is an enhancement layer or view 20, then any reference pictures can generally be selected among pictures present in the enhancement layer or view 20 or in a lower layer or view, such as the base layer or view 10. However, if single_layer_for_non_irap_flag is set equal to one, a picture in an enhancement layer or view 20 can either reference one or more pictures from one or more lower layers or views or pictures from the current enhancement layer or view 20 but typically not both of them.

Step S11 as shown in FIG. 5 comprises identifying the switching point 2 in the multi-layer or multi-view video 1. Hence, step S11 preferably comprises identifying a need for switching from encoding pictures 12, 14 in the first layer or view 10 to encoding pictures 22, 24 in the second layer or view 20.

The identification in step S11 could be performed according to various embodiments. For instance, the choice to perform the switch could be based, at least partly, on information of current network conditions of a wireless or wired communication network employed for transmitting the encoded bitstream 40 from a transmitting unit 500, where the encoding is taking place, to a receiving unit 510, where decoding may take place, see FIG. 22. For instance, the network conditions may improve so that the available bandwidth or bitrate for transmitting the encoded bitstream 40 may increase. In such a case, it could be possible to increase the resolution or quality of the multi-layer or multi-view video, such as by switching to an (a higher) enhancement layer or view. Correspondingly, if the network conditions deteriorate resulting in a reduction in the available bandwidth and/or bitrate, then there could be a need to decrease the resolution or quality of the multi-layer or multi-view video, such as by switching to the base layer or view.

Alternatively, the switching between layers or views could be based on a user-initiated request for, for instance, a change in resolution or quality. The user could then be the user of the device comprising the encoder or indeed the user of the device in which the decoding and/or play back of the video is taking place.

Furthermore, an encoder can decide to switch between layers or views based on the current capacity level, for instance as represented by Central Processing Unit (CPU) load. If the encoder determines or verifies that there are computational resources available it may choose to increase the resolution and switch to encoding an enhancement layer or view or a higher level enhancement layer or view.

In yet another example, an encoder may decide to switch between layers or views based on feedback that it gets from the network, e.g. regarding congestion or packet loss rate. If the packet loss rate is higher than a threshold value the encoder may choose to reduce the resolution and decrease the bitrate, for instance by switching down to encoding a lower layer or view.

The encoding at the switching point 2 is taking place as discussed in the foregoing and shown in steps S1, S2 of FIG. 4, i.e. encoding one of the pictures 12, 22 coinciding at the switching point 2 as a skip picture.

The following step S12 in FIG. 5 comprises encoding pictures 24 in the second layer or view 20 from or following the switching point 2. The encoding as performed of the pictures 24 in the second layer or view following, according to the encoding and decoding order, the picture 22 coinciding at the switching point 2 is typically performed as discussed above for step S1, i.e, preferably using at least one of rate-distortion optimization, a fixed number of bits and a fixed quality level.

A multi-layer or multi-view video 1 may comprise one or multiple switching points 2. In such a case, the operation as shown in FIG. 4 is preferably performed at each such switching point 2, whereas the pictures 14, 24 in layers or views 10, 20 prior to, in between or following switching points 2 are preferably encoded as discussed above in connection with steps S10 and S12 of FIG. 5, i.e, preferably using at least one of rate-distortion optimization, a fixed number of bits and a fixed quality level.

As discussed in the foregoing, the multi-layer or multi-view video 1 comprises pictures 12, 22 in both the first layer or view 10 and the second layer or view 20 at the switching point 2. However, during playback typically only one of these pictures 12, 22 will be displayed and presented to a user. In an embodiment, the encoded bitstream, i.e. the encoded representation of the multi-layer or multi-view video 1, could signal which of these pictures 12, 22 at the switching point that should be output by a decoder for display.

Figure 6:
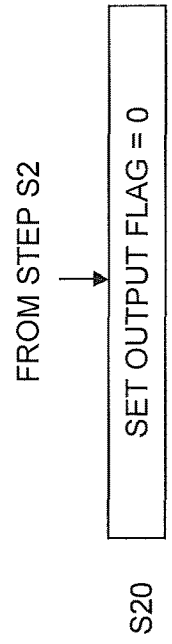
FIG. 6 is a flow chart illustrating an additional, optional step of the method shown in FIG. 4.

FIG. 6 is a flow chart illustrating an addition, optional step of the method in FIG. 4 for signaling which picture coinciding at the switching point 2 that should be output by a decoder. The method continues from step S2 in FIG. 4. A next step S20 comprises setting an output flag of the other of the picture 12 in the first layer or view 10 and the picture 22 in the second layer or view 20 coinciding at the switching point 2 to zero to indicate that the other of the picture 12 in the first layer or view 10 and the picture 22 in the second layer or view 20 coinciding at the switching point 2 is not to be output by a decoder.

Thus, in this embodiment, an output flag for the picture encoded as a skip picture in step S2 of FIG. 4 is set to a predefined value, preferably zero ($0_{bin}$), to thereby indicate that the skip picture should, following decoding at the decoder, not be output. In an embodiment, output by a decoder corresponds to output for display.

In an optional embodiment, the method may also comprise setting an output flag of the one of the picture 12 in the first layer or view 10 and the picture 22 in the second layer or view 20 coinciding at the switching point 2 to one to indicate that the one of the picture 12 in the first layer or view 10 and the picture 22 in the second layer or view 20 coinciding at the switching point 2 is to be output by a decoder.

In this embodiment, an output flag for the picture encoded in step S1 of FIG. 4 is set to a predefined value, preferably one ($1_{bin}$), to thereby indicate that the picture should, following decoding at the decoder, be output, preferably be output for display.

In other embodiments, the output flag could alternatively, or in addition, be used by other entities than a decoder, for instance a transcoder or a network node. The transcoder or network node could then use the value of the output flag of a picture to determine whether the picture should be output or not. Output could, for instance, relate to output for transmission, output for storage in a memory, etc.

HEVC defines a Network Abstraction Layer (NAL). All the data, i.e. both video and non-video, of HEVC is encapsulated in NAL units. The NAL unit begins with a header (2 bytes) that among other things contains the NAL unit type which identifies what type of data is carried in the NAL unit. The NAL unit type is transmitted in the nal_unit_type codeword in the NAL unit header and the type indicates and defines how the NAL unit should be parsed and decoded. A bitstream consist of a series of concatenated NAL units.

In SHVC, suggestions to simplify the signaling of an entire skip or skipped picture in the enhancement layer has been proposed as a new kind of NAL unit indicating that the whole picture is skipped.

Figure 7:
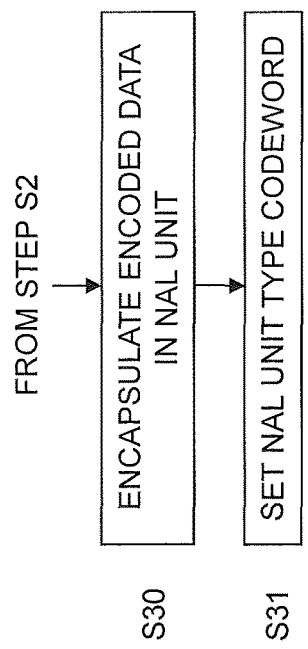
FIG. 7 is a flow chart illustrating additional, optional steps of the method shown in FIG. 4.

FIG. 7 is a flow chart illustrating additional, optional steps of the method in FIG. 4 implementing such an embodiment. The method continues from step S2 in FIG. 4. A next step S30 comprises encapsulating encoded data of the other of the picture 12 in the first layer or view 10 and the picture 22 in the second layer or view 20 coinciding at the switching point 2 in a NAL unit comprising a NAL unit header. A following step S31 comprises setting a NAL unit type codeword in the NAL unit header to a defined value indicating that the NAL unit comprises encoded data of a skip picture.

Hence, step S30 thereby encapsulates the encoded data of the skip picture as encoded in step S2 in a NAL unit. Depending on the particular original picture to be encoded as a skip picture, such as the number of slices in the picture, the encoded data can be encapsulated in step S30 in one or multiple NAL units. The NAL unit type codeword, set in step S31 to the defined value to signal that the NAL unit comprises encoded data of a skip picture, is preferably the previously mentioned nal_unit_type codeword.

Generally, an HEVC picture is divided into one or more slices. Each slice has a slice header containing necessary information to decode the slice. In SHVC, suggestions to simplify the signaling of an entire skip or skipped picture in the enhancement layer has been proposed using a flag 42 in the slice header, which has to have the same value in all slices of a picture exemplified in FIG. 22.

FIG. 8 is a flow chart illustrating an additional, optional step of the method in FIG. 4 implementing such an embodiment. In this embodiment, the other of the picture 12 in the first layer or view 10 and the picture 12 in the second layer or view 20 coinciding at the switching point 2 comprises at least one slice. The method continues from step S2 in FIG. 4. A next step S40 comprises setting a flag in a respective slice header of the at least one slice to a defined value indicating that the at least one slice is present in a skip picture.

The respective flag in the slice header of each slice in the picture encoded as a skip picture in step S2 in FIG. 4 is thereby set to defined value, such as one, to indicate that the slice is present in a picture encoded as a skip picture.

In an embodiment, the multi-layer or multi-view video 1 is a multi-layer video 1 comprising a base layer 10 and an enhancement layer 20 as shown in FIG. 3. A particular implementation example of FIG. 4 is shown in FIG. 9 for such a multi-layer video 1. The method comprises encoding, in step S50, a picture 12 in a base layer 10 coinciding at the switching point 2 in the multi-layer video 1. Step S51 of FIG. 9 comprises encoding a picture 22 in an enhancement layer 20 coinciding at the switching point 2 of the multi-layer video 1 as a skip picture.

Hence, in this implementation example, the picture 22 present in the enhancement layer 20 is encoded as a skip picture at the switching point 2 whereas the corresponding picture 12 in the base layer 10 is preferably encoded using at least one of rate-distortion optimization, a fixed number of bits and a fixed quality level.

In SHVC there can be pictures from different layers with the same POC value, representing the output order of pictures, which are said to belong to the same AU. In typical SHVC streams there are pictures in all layers in every AU but in the case of ARC the encoder would typically chose to set the single_layer_for_non_irap_flag equal to 1. single_layer_for_non_irap_flag equal to 1 indicates that there are at most two pictures in each AU and when there are two pictures in the same AU the one in the highest layer must be an IRAP picture. When more than one picture are signaled in the same AU they must belong to different layers, i.e. have different layer identifiers as represented by the codeword nuh_layer_id.

Then there is only one picture in each AU, either in the base layer or in an enhancement layer. The only exception is when the enhancement layer picture is signaled as an IRAP picture. In that AU it is allowed to have pictures in both the base layer and enhancement layer(s). This means that the base layer picture can be used for prediction by the enhancement layer. It also means that the enhancement layer picture cannot reference any pictures in the enhancement layer since it is coded as an IRAP picture.

In an embodiment, the multi-layer or multi-view video 1 is a multi-layer video 1 in which each layer 10, 20 has a respective layer identifier, such as represented by the codeword nuh_layer_id. FIG. 10 then illustrates a flow chart of additional, optional steps of the method as shown in FIG. 4 for such an embodiment. Step S60 of FIG. 10 comprises setting a flag, single_layer_for_non_irap_flag, equal to one ($1_{bin}$) to indicate that there are at most two pictures 12, 22 in each AU 30, 32 and when there are two pictures 12, 22 in a same AU 30 the picture 22 in a highest layer 20 is an IRAP picture 22. The method also comprises signaling in step S61 in the encoded bitstream corresponding to an encoded version of the multi-layer video 1 that every block of the IRAP picture 22 is encoded as a skip block.

The highest layer 20 is typically the enhancement layer 20 for a multi-layer video 1 with a base layer 10 and an enhancement layer 20. However, if the switch between layers in the multi-layer video 1 is between two enhancement layers then the highest layer indicated above is preferably the enhancement layer having the highest layer identifier, i.e. highest nuh_layer_id value.

The signaling in the encoded bitstream in step S61 that every block in the IRAP picture is encoded as a skip block can be performed according to various embodiments. For instance, a syntax element, such as a codeword or flag, could be included in the encoded bitstream or associated to the encoded bitstream. As an example, an encoded bitstream typically comprises or is associated with various parameter sets carrying control data that can be used by the decoder when decoding the encoded representations of the pictures in the multi-layer video. Different such parameter sets are possible including picture parameter set (PPS), sequence parameter set (SPS) and video parameter set (VPS). Generally, the PPS carries control data applicable to a picture referring to the PPS including all the slices of that picture. SPS comprises control data applicable to a sequence of pictures in the multi-layer video, whereas the VPS contains control data applicable to the complete video sequence.

In such a case, a slice header carries a PPS identifier identifying the particular PPS that is applicable to the current slice of a picture. The PPS may in turn comprise an SPS identifier identifying the particular SPS that is applicable to the pictures with slice headers containing PPS identifiers referring to a PPS with this SPS identifier. An SPS may in turn comprise a VPS identifier identifying a particular VPS.

The syntax element used for the signaling in step S61, such as codeword or flag, could therefore be present in a parameter set, such as in a VPS, an SPS or a PPS.

Alternatively, the syntax element used for signaling in step S61, such as codeword or flag, could be present in a parameter set extension, such as in a VPS extension, an SPS extension or a PPS extension. In such a case, the relevant parameter set preferably comprises an extension flag, such as vps_extension_flag, sps_extension_flag or pps_extension_flag, to indicate that the parameter set comprises a parameter set extension.

Also other data structure present in or associated with an encoded bitstream could be used for the signaling in step S61. Non-limiting examples of such other data structures include video usability information (VUI) and supplemental enhancement information (SEI). An example of the former is VPS VUI, whereas SEI can be in the form of various types of SEI messages. Presence of a VPS VUI could, for instance, be indicated by the inclusion of vps_vui_presence_flag present in a VPS extension or VPS.

In an alternative embodiment, the syntax element used for the signaling in step S61, such as codeword or flag, could be present in a slice header of the slices in the IRAP picture to be encoded as a skip picture.

The signaling in step S61, such as represented by a codeword or flag, is preferably present in a same syntax or data structure as the single_layer_for_non_irap_flag.

The block of the IRAP picture is a block of samples or pixels. Such a block is generally denoted coding unit (CU) within HEVC.

In an embodiment, the picture 12 in the first layer of view 10 and the picture 22 in the second layer or view 20 coinciding at the switching point 2 have a same POC value and belong to a same AU.

In another embodiment, the picture 12 in the first layer of view 10 and the picture 22 in the second layer or view 20 coinciding at the switching point 2 represent different versions of a same original image but at different resolutions and/or quality levels. In a particular implementation example of this embodiment, the multi-layer or multi-view video 1 is thereby a multi-layer video 1 with layers having different resolutions and/or quality levels. Hence, in this implementation example the first layer 10 and the second layer 20 comprise different versions of a same video content but at different resolutions and/or quality levels.

FIG. 11 is a flow chart illustrating another aspect of the embodiments defining a method for encoding a multi-layer video 1. Each layer 10, 20 of the multi-layer video 1 has a respective layer identifier. The method comprises setting, in step S70, a flag, such as single_layer_for_non_irap_flag, equal to 1 to indicate that there are at most two pictures 12, 22 in each AU 30, 32 and when there are two pictures 12, 22 in a same AU 30 the picture 22 in a highest layer 20 is an IRAP picture 22. The method also comprises signaling in step S71 in an encoded bitstream corresponding to an encoded version of the multi-layer video 1 that every block of the IRAP picture 22 is encoded as a skip block.

Steps S70 and S71 of FIG. 11 thereby basically correspond to steps S60 and S61 as shown in FIG. 10 but do not necessarily have to be implemented in connection with steps S1 and S2 of FIG. 4. The discussion above with regard to various embodiments and implementation examples of steps S60 and S61 therefore applies to the method as shown in FIG. 11 and comprising steps S70 and S71.

In a particular implementation example the encoded bitstream comprises a VPS as defined below:

| | Descriptor |
|---|---|
| video_parameter_set_rbsp( ) { | |
| ... | |
|     vps_extension_flag | u(1) |
|     if( vps_extension_flag ) { | |
|         while( !byte_aligned( ) ) | |
|             vps_extension_alignment_bit_equal_to_one | u(1) |
|         vps_extension( ) | |
|     ... | |
|     } | |
|     rbsp_trailing_bits( ) | |
| } | | vps_extension_flag equal to 0 specifies that no vps_extension( ) syntax structure is present in the VPS RBSP syntax structure. vps_extension_flag equal to 1 specifies that the vps_extension( ) syntax structure is present in the VPS RBSP syntax structure.

vps_extension_alignment_bit_equal_to_one shall be equal to 1.

| | Descriptor |
|---|---|
| vps_extension( ) { | |
| ... | |
|     vps_vui_present_flag | u(1) |
|     ... | |
| } | | vps_vui_present_flag equal to 1 specifies that the vps_vui( ) syntax structure is present in the VPS. vps_vui_present_flag equal to 0 specifies that the vps_vui( ) syntax structure is not present in the VPS.

| | Descriptor |
|---|---|
| vps_vui( ) { | |
| ... | |
|     single_layer_for_non_irap_flag | u(1) |
|     higher_layer_irap_skip_flag | u(1) |
|     ... | |
| } | | single_layer_for_non_irap_flag equal to 1 indicates either that all the VCL NAL units of an access unit have the same nuh_layer_id value or that two nuh_layer_id values are used by the VCL NAL units of an access unit and the picture with the greater nuh_layer_id value is an IRAP picture.

higher_layer_irap_skip_flag equal to 1 indicates that for every IRAP picture that refer to the VPS, for which there is another picture in the same access unit with a lower value of nuh_layer_id, the following constraints apply:

For all coding units of the IRAP picture:
cu_skip_flag[i][j] shall be equal to 1.

An encoder may set both single_layer_for_non_irap_flag and higher_layer_irap_skip_flag equal to 1 as an indication to a decoder that whenever there are two pictures in the same access unit, the one with the higher nuh_layer_id is an IRAP picture for which the decoded samples can be derived by applying a resampling process for inter layer reference pictures with the other picture as input.

In an embodiment, cu_skip_flag[i][j] equal to 1 specifies that the current coding unit is skipped. For instance, this could indicate that when decoding a P or B slice, no more syntax elements except the merging candidate index merge_idx[i][j] are parsed after cu_skip_flag[i][j]. The array indices i, j preferably specify the location of the top left pixel or sample of the current coding unit relative to the top left pixel or sample of the picture.

Figure 12:
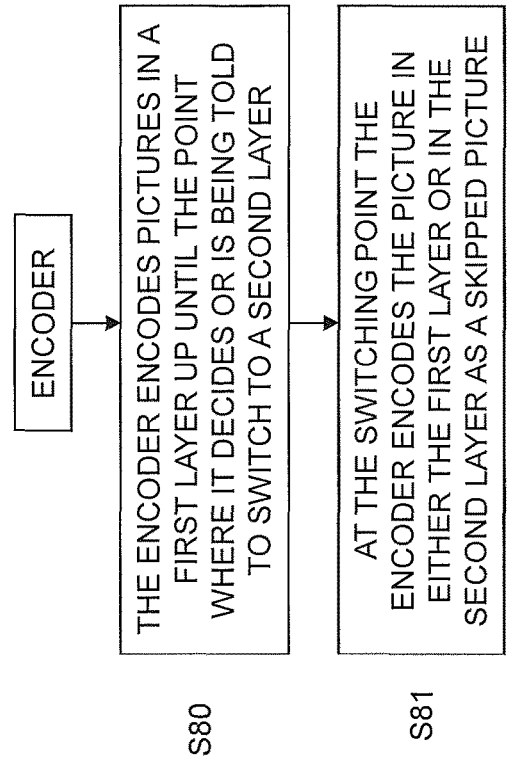
FIG. 12 is a flow chart illustrating a method for encoding multi-layer or multi-view video according to yet another embodiment.

According to embodiments, an encoder for encoding a bitstream containing different versions of the same video with e.g. different resolutions and/or quality associated to different layers is provided. A corresponding method is illustrated in FIG. 12. The encoder encodes, in step S80, pictures in a first layer up until the point where it decides or is being told to switch to a second layer. At the layer switch, the bitstream represents pictures from both layers and the encoder is configured to code, in step S81, one of the pictures at a layer switch as a skip picture in order to avoid the previously mentioned redundancy. Thus, one of the pictures at the switching point could be coded with conventional techniques where each picture is encoded to be as close as possible to the original picture using for example rate-distortion optimization, a fixed number or of bits or a fixed quality level and the other picture at the switching point is a skipped picture.

In other words, an encoder encodes a layer switch through encoding pictures in two different layers in the same access unit where one of them is encoded as a skipped picture which implies that no mode information, motion information or residual information is added.

An advantage with at least some of the embodiments, as coding a picture as skipped is low in complexity, the embodiments minimize the extra complexity when coding a switching point. The bit cost is also minimized since as few as possible extra bits are spent encoding a picture that will not be output.

Even though the embodiments are described in the context of SHVC and HEVC, the embodiments are not limited to SHVC or HEVC but may be applied to other codecs.

The Example Embodiments below are applied to a switch point between the base layer and an enhancement layer. However, the embodiments are not limited to that case but can be at a switch point between any layers, e.g. from one enhancement layer to another enhancement layer.

The embodiments are not limited to the case where only two layers exist or when switching is only performed from one layer to another but can applied to the case were switching is performed over several layers in the same access unit.

The embodiments are not limited to the case were resolution is different between the layers but can be applied to any type of differences between the layers such as using different tools in the different layers.

Further the embodiments are not limited to scalable codecs but may also be applied to other layered codecs such as multi-view codecs in which case a switching point corresponds to a switch of view.

Herein various example embodiments will be further described,

Example Embodiment 1

In one embodiment the encoder encodes the base layer picture 12 at switch point 2 as skip. The enhancement layer picture 22 at switch point 2 predicts pixel data from the skipped picture 12 in the base layer 10, see FIG. 13.

An encoder may be configured to perform the following steps:

1. The encoder encodes the base layer pictures up until the point where it decides or is being told to switch to a higher layer 20, i.e. create a switching point 2.

2. At the switching point 2 the encoder encodes the base layer picture 12 as a skip picture.

3. Then the enhancement layer picture 22 of the switching point 2 is encoded using prediction from the base layer picture 12 at the switching point 2.

In one version of the embodiment the output flag of the skip picture in the base layer 10 is set equal to 0 in order to make the decoder aware of that this picture 12 is not supposed to be output.

An encoder may be configured to perform the following steps:

1. The encoder encodes the base layer pictures up until the point where it decides or is being told to switch to a higher layer 20, i.e. create a switching point 2.

2. At the switching point 2 the encoder encodes the base layer picture 12 as a skip picture and sets the output flag of that picture to 0.

3. Then the enhancement layer picture 22 of the switching point 2 is encoded using prediction from the base layer picture 12 at the switching point 2 and the output flag of that picture is set to 1, Example Embodiment 2

In one embodiment the encoder encodes the enhancement layer picture 22 at switch point 2 as a skipped picture. The pixel data of the base layer picture 12 at switch point 2 is scaled to the size of the enhancement layer and used for prediction in the enhancement layer picture 22, see FIG. 14.

An encoder may be configured to perform the following steps:

1. The encoder encodes the base layer pictures up until the point where it decides or is being told to switch to a higher layer 20, i.e. create a switching point 2.

2. At the switching point 2 the encoder encodes the base layer picture 12.

3. Then the enhancement layer picture 22 of the switching point 2 is encoded as a skip picture using the base layer picture 12 for reference.

Example Embodiment 3

Example Embodiment 1 and 2 can also be used in a reverse order for down-switch points. The encoder may encode the enhancement layer picture 22 or base layer picture 12 at switch point 2 as a skip picture, see FIGS. 15 and 16.

An encoder may be configured to perform the following steps:

1. The encoder encodes the enhancement layer pictures up until the point where it decides or is being told to switch to a lower layer 10, i.e. create a switching point 2.

2. At the switching point 2 the encoder encodes the enhancement layer picture 22 either as regularly or as skipped.

3. Then the base layer picture 12 of the switching point 2 is encoded as regularly or as skip (opposite to the enhancement layer picture 22) using the enhancement layer picture 22 for reference.

Example Embodiment 4

In one embodiment, Example Embodiment 1, 2 or 3 is implemented such as the encoder signals in the bitstream every block as a skipped block.

An encoder may be configured to perform the following steps:

1. The encoder creates a switching point with a skipped picture.

2. The encoder iteratively encodes every block in the picture as a skipped block, i.e. codes it with inter prediction, with zero motion vector and no residual.

Example Embodiment 5

In one embodiment, Example Embodiment 1, 2 or 3 is implemented such as the encoder signals in every slice header of the picture by a syntax element that the pictures is skipped.

An encoder may be configured to perform the following steps:

1. The encoder creates a switching point with a skipped picture.

2. The encoder encodes the picture as one or more slice headers including a syntax element indicating that the picture is skipped.

Example Embodiment 6

In one embodiment, Example Embodiment 1, 2 or 3 is implemented such as the encoder signals a special type of NAL unit which decodes as a skipped picture.

An encoder may be configured to perform the following steps:

1. The encoder creates a switching point with a skipped picture.

2. The encoder encodes the picture using a NAL unit type indicating the picture is skipped.

Example Embodiment 7

In one embodiment, Example Embodiment 1 or 2 is implemented with the addition that the output from the target layer is delayed one picture at the switching point. The switch point picture in the target layer is a coded or skipped picture with picture output flag set to zero, see FIG. 17.

An encoder may be configured to perform the following steps:

1. The encoder encodes the base layer pictures up until the point where it decides or is being told to switch to a higher layer, i.e, create a switching point.

2. At the switching point the encoder encodes the base layer picture. This picture may be skipped or not.

3. Then the enhancement layer picture of the switching point is encoded using the base layer picture for reference. If the base layer picture was not skipped this enhancement layer picture is encoded as skipped and vice versa. The enhancement layer picture is encoded as not to be output, i.e. output flag is set to 0.

According to a further aspect of the embodiments, an encoder for encoding a bitstream containing different versions of the same video with e.g. different resolutions and/or quality associated to different layers is provided. The encoder comprises a first encoding unit for encoding pictures in a first layer up until the point where it decides or is being told to switch to a second layer, a unit for determining which picture to be encoded as skipped picture. At the layer switch, the bitstream represents pictures from both layers and the encoder comprises a unit configured to code one of the pictures at the layer switch as a skip picture in order to avoid the above mentioned redundancy. The encoder comprises an in/output unit for sending the encoded bitstream and other information e.g. signaling indicating the skipped picture, see FIG. 20.

Figure 19:
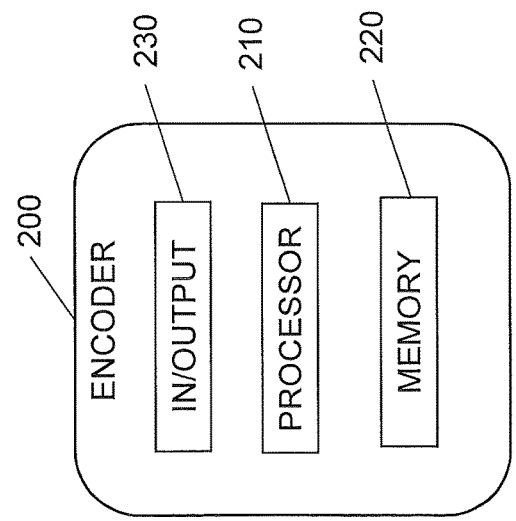
FIG. 19 is a block diagram of a multi-layer or multi-view video encoder according to another embodiment.

The encoder may be implemented by a computer comprising a processor and a memory according to FIG. 19. Said memory contains instructions executable by said processor whereby said encoder is operative to perform the method according to FIG. 12.

The encoder can be implemented in a transmitting unit e.g. a video camera or a mobile device.

An aspect of the embodiments therefore relates to a multi-layer or multi-view video encoder operable to encode one of a picture 12 in a first layer or view 10 and a picture 22 in a second layer or view 20 of a multi-layer or multi-view video 1 coinciding at a switching point 2 defining a switch between the first layer or view 10 and the second layer or view 20 in the multi-layer or multi-view video 1 comprising multiple layers or views 10, 20. The multi-layer or multi-view video encoder is also operable to encode the other of the picture 12 in the first layer or view 10 and the picture 22 in the second layer or view 20 coinciding at the switching point 2 as a skip picture.

Figure 18:
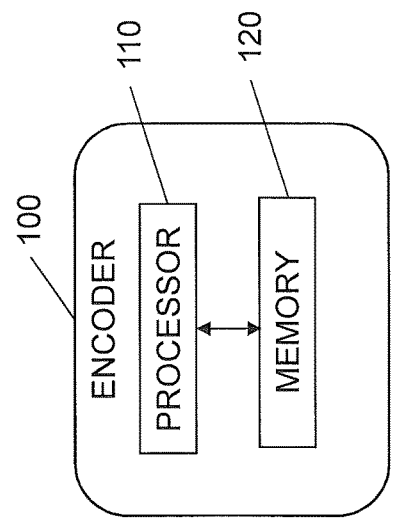
FIG. 18 is a block diagram of a multi-layer or multi-view video encoder according to an embodiment.

FIG. 18 illustrates a particular implementation embodiment of a multi-layer or multi-view video encoder 100 comprising a processor 110 and a memory 120. The processor 110 and the memory 120 are preferably interconnected to each other to enable normal processing function. The processor 110 of the multi-layer or multi-view video encoder 100 is operable, configured or adapted to encode the one of the picture 12 in the first layer or view 10 and the picture 22 in the second layer or view 20 coinciding at the switching point 2. The processor 110 is also operable to encode the other of the picture 12 in the first layer or view 10 and the picture 22 in the second layer or view 20 coinciding at the switching point 2 as a skip picture.

The processor 110 is preferably also operable to encode the one of the picture 12 in the first layer or view 10 and the picture 22 in the second layer or view 20 coinciding at the switching point 2 using at least one of rate-distortion optimization, a fixed number of bits and a fixed quality level as previously discussed herein.

In an embodiment, the processor 110 is preferably operable to identify the switching point 2 in the multi-layer or multi-view video 1. The processor 110 may, for instance, identify the switching point 2 based on a request for a change in video resolution or quality, such as a request for up-switch or down-switch. Such a request could be received from the user terminal receiving the encoded multi-layer or multi-view video or from a network entity monitoring the network conditions of the communication network used for communicating the encoded multi-layer or multi-view video from an encoding entity to a decoding entity. Alternatively, the processor 110 identifies a need for a switching point, such as based on information of current processing capacity level and/or feedback on network performance, such as regarding congestion or packet loss rate.

The processor 110 is preferably operable to encode pictures 14 in the first layer or view 10 up until the switching point 2. In such a case, the processor 110 preferably encodes these pictures 14 prior to the picture 12 at the switching point 2 using at least one of rate-distortion optimization, a fixed number of bits and a fixed quality level. The processor 110 is preferably also, or additionally, operable to encode pictures 24 in the second layer or view 20 following the switching point 2. In such a case, the processor 110 preferably encodes these pictures 24 following the picture 22 at the switching point 2 using at least one of rate-distortion optimization, a fixed number of bits and a fixed quality level.

In an embodiment, the processor 110 is preferably operable to set an output flag of the other of the picture 12 in the first layer or view 10 and the picture 22 in the second layer or view 20 coinciding at the switching point 2 to zero to indicate the other of the picture 12 in the first layer or view 10 and the picture 22 in the second layer or view 20 coinciding at the switching point 2 is not to be output by a decoder. Hence, in this embodiment, the processor 110 is preferably operable to set the output flag of the picture encoded as a skip picture at the switching point 2 to a value, e.g. zero, that informs a decoder that the picture should not be output, such as output for display, following decoding.

The processor 110 is preferably operable to encode the other of the picture 12 in the first layer or view 10 and the picture 22 in the second layer or view 20 coinciding at the switching point 2 as a skip picture indicating that sample values are to be copied from a previous, according to an encoding and decoding order, picture 12 of the multi-layer or multi-view video 1 or that resampled versions of the sample values are to be used.

For instance, if the picture 22 in the second layer or view 20 coinciding at the switching point 2 in FIG. 3 is encoded as a skip picture by the processor 110, then sample values, preferably resampled versions of the sample values, are copied from the picture 12 in the first layer or view 10 coinciding at the switching point 2. In other words, the sample values of the skip picture 22 will be resampled, typically up-scaled, versions of the sample values of the picture 12. The resampling is necessary if the two pictures 12, 22 have different resolutions. However, the resampling process preferably does not change the sample values, i.e. no residual is preferably added to the resampled values.

In an embodiment, the processor 110 is preferably operable to encode the other of the picture 12 in the first layer or view 10 and the picture 22 in the second layer or view 20 coinciding at the switching point 2 as a skip picture using a merge mode of HEVC.

In a particular implementation embodiment, the processor 110 is preferably operable to encode a picture 12 in a base layer 10 of a multi-layer video 1 coinciding at the switching point 2. The processor 110 is further operable to encode a picture 22 in an enhancement layer 20 of the multi-layer video 1 coinciding at the switching point 2 as a skip picture. In a preferred embodiment, the processor 110 is operable to encode the picture 12 in the base layer 10 using at least one of rate-distortion optimization, a fixed number of bits and a fixed quality level.

In an embodiment, each layer 10, 20 of the multi-layer video 1 has a respective layer identifier, such as nuh_layer_id. The processor 110 is then preferably operable to set a flag, such as single_layer_for_non_irap_flag, equal to one to indicate that there are at most two pictures 12, 22 in each AU 30, 32 and when there are two pictures 12, 22 in a same AU 30 the picture 22 in the highest layer 20 is an IRAP picture 22. The processor 110 is preferably also operable to signal, in the encoded bitstream corresponding to an encoded version of the multi-layer video 1, that every block of the IRAP picture 22 is encoded as a skip block.

For instance, the processor 110 may be operable to set both single_layer for non_irap_flag and higher_layer_irap_skip_flag to one to indicate for a decoder that whenever there are two pictures 12, 22 in the same AU 30 then the picture 22 with the higher layer identifier (nu_layer_id) is an IRAP picture for which the decoded sample values are derived by applying a resampling process for inter layer reference pictures with the picture 12 with lower layer identifier as input. Hence, resampled versions of the sample values are copied from the picture 12 to the IRAP picture 22 if both these flags are set to one.

The multi-layer or multi-view video encoder 200 may additionally comprise an input and output unit 230 as shown in FIG. 19 in addition to the processor 210 and the memory 220. This input and output unit 230 is then preferably operable to receive pictures 12, 14, 22, 24 of the multi-layer or multi-view video 1 to be encoded by the multi-layer or multi-view video encoder 200. The input and output unit 230 is preferably also operable to output the encoded pictures, such as in the form of an encoded bitstream of NAL units as previously discussed herein.

Figure 20:
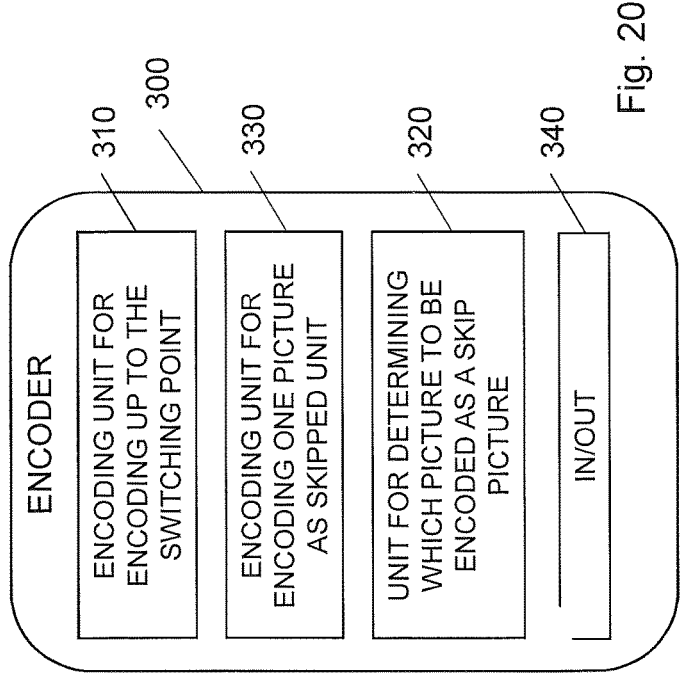
FIG. 20 is a block diagram of a multi-layer or multi-view video encoder according to a further embodiment.

FIG. 20 is a schematic block diagram of another embodiment of a multi-layer or multi-view encoder 300. The multi-layer or multi-view encoder 300 comprises a first encoding unit 310 operable to encode pictures 14 in a first layer or view 10 of a multi-layer or multi-view video 1 comprising multiple layers or views 10, 20 up until a switching point 2 defining a switch between the first layer or view 10 and a second layer or view 20 of the multi-layer or multi-view video 1. The multi-layer or multi-view encoder 300 also comprises a unit 320 operable to determine one of a picture 12 in the first layer or view 10 and a picture 22 in the second layer or view 20 coinciding at the switching point 2 to be encoded as a skip picture. A second encoding unit 330 is operable to encode the determined picture 22 as a skip picture. The multi-layer or multi-view encoder 300 further comprises an in/output unit 340 operable to send an encoded bitstream 40 correspond to an encoded version of the multi-layer or multi-view video 1.

Figure 21:
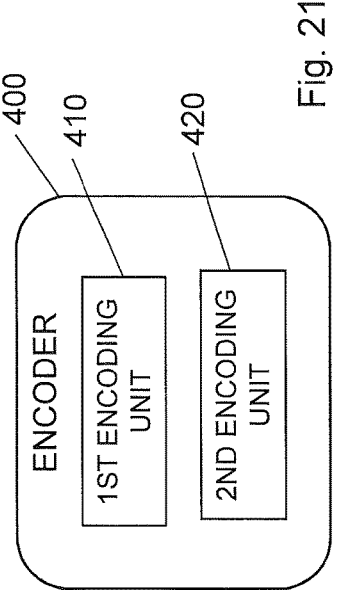
FIG. 21 is a block diagram of a multi-layer or multi-view video encoder according to yet another embodiment.

A further embodiment of a multi-layer or multi-view encoder 400 is illustrated in FIG. 21. The multi-layer or multi-view encoder 400 comprises a first encoding unit 410 for encoding one of a picture 12 in a first layer or view 10 and a picture 22 in a second layer or view 20 of a multi-layer or multi-view video 1 coinciding at a switching point 2 defining a switch between the first layer or view 10 and the second layer or view 20 in the multi-layer or multi-view video 1 comprising multiple layers or views 10, 20. The multi-layer or multi-view encoder 400 also comprises a second encoding unit 410 for encoding the other of the picture 12 in the first layer or view 10 and the picture 22 in the second layer or view 20 coinciding at the switching point 2 as a skip picture.

Yet another aspect of the embodiments relates to a multi-layer video encoder for encoding a multi-layer video 1 in which each layer 10, 20 of the multi-layer video 1 has a respective layer identifier. The multi-layer video encoder is operable to set a flag, single_layer_for_non_irap_flag, equal to 1 to indicate that there are at most two pictures 12, 22 from two different layers 10, 20 of the multi-layer video 1 in each AU 30, 32 and when there are two pictures 12, 22 in a same AU 30 the picture 22 in a highest layer 20 of the two different layers 10, 20 is an IRAP picture 22. The multi-layer video encoder is preferably also operable to signal, in an encoded bitstream 40 corresponding to an encoded version of the multi-layer video 1, that every block of the IRAP picture 22 is encoded as a skip block.

In an embodiment, the multi-layer video encoder is preferably operable to perform the signaling in the bitstream 40 by setting a flag, higher_layer_irap_skip_flag, to a defined value, preferably one, to indicate that every block of the IRAP picture 22 is encoded as a skip block. The multi-layer video encoder is preferably operable to insert these two flags, single_layer_for_non_irap_flag and higher_layer_irap_skip_flag, in a VPS of the encoded bitstream 40, such as in the VPS VUI of the encoded bitstream 40.

In a particular embodiment, the multi-layer video encoder is operable to signal, in the encoded bitstream 40, that every block of the IRAP picture 22 is encoded as a skip block indicating that decoded sample values of the block are derived by resampling sample values from the picture 12 in a lowest layer 20 of the two different layers 10, 20 of the two pictures 12, 22 in the same AU 30.

The multi-layer video encoder according to this aspect may be implemented as a processor 110, 210 and a memory 120, 220 as shown in FIGS. 18 and 19. In such a case, the processor 110, 210 is operable to set the flag single_layer_for_non_irap_flag equal to 1. The processor 110, 210 is also operable to signal, in the encoded bitstream 40, that every block of the IRAP picture 22 is encoded as a skip block.

Alternatively, the multi-layer video encoder can be implemented as comprising a flag setting unit and a signaling unit. In such a case, the flag setting unit is operable to set the flag single_layer_for_non_irap_flag equal to 1 and the signaling unit is operable to signal, in the encoded bitstream 40, that every block of the IRAP picture 22 is encoded as a skip block, such as by setting the flag higher_layer_irap_skip_flag equal to 1.

In a further embodiment, the multi-layer video encoder comprises a flag setting unit for setting the flag single_layer_for_non_irap_flag equal to 1. The multi-layer video encoder also comprises a signaling unit for signaling, in the encoded bitstream 40, that every block of the IRAP picture 22 is encoded as a skip block, such as by setting the flag higher_layer_irap_skip_flag equal to 1.

It will be appreciated that the methods and devices described herein can be combined and re-arranged in a variety of ways.

For example, embodiments may be implemented in hardware, or in software for execution by suitable processor processing circuitry, or a combination thereof.

The steps, functions and/or units described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions and/or units described herein may be implemented in software such as a computer program for execution by suitable processing circuitry such as one or more processors or processing units.

The flow charts presented herein may therefore be regarded as a computer flow diagrams, when performed by one or more processors. A corresponding apparatus may be defined as a group of function modules or units, see FIG. 21, where each step performed by the processor corresponds to a function module or unit. In this case, the function modules or units are implemented as a computer program running on the processor.

Examples of processing circuitry and processors includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 23:
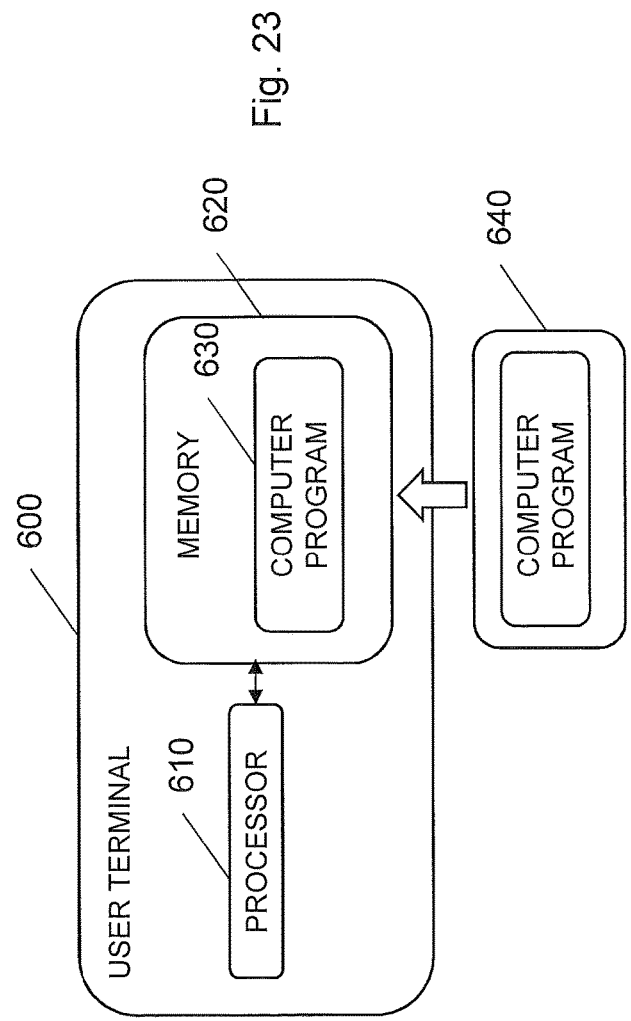
FIG. 23 schematically illustrates a user terminal and a computer program according to an embodiment.

In the following, an example of a computer implementation will be described with reference to FIG. 23. FIG. 23 illustrates a user terminal 600 comprising processing circuitry, such as one or more processors 610, and a memory 620. In this particular example, at least some of the steps, functions and/or units described herein are implemented in a computer program 630, which is loaded into the memory 620 for execution by the processor 610. The processor 610 and memory 620 are interconnected to each other to enable normal software execution. An optional input/output device (not illustrated) may also be interconnected to the processor 610 and/or the memory 620 to enable input and/or output of relevant data such as pictures of the multi-layer or multi-view video and/or encoded pictures, such as in NAL units.

The term 'computer' should be interpreted in a general sense as any system or device capable of executing program code or computer program instructions to perform a particular processing, determining or computing task.

In a particular embodiment, the computer program 630 comprises program code or code means which when executed by the processor 610 or user terminal 600 causes the processor 610 or user terminal 600 to, in an embodiment, encode one of a picture in a first layer or view and a picture in a second layer or view of a multi-layer or multi-view video coinciding at a switching point defining a switch between the first layer or view and the second layer or view in the multi-layer or multi-view video comprising multiple layers or views. The code means also causes the processor 610 or user terminal 600 to encode the other of the picture in the first layer or view 10 and the picture in the second layer or view coinciding at the switching point as a skip picture.

In another embodiment, the code means causes, when executed by the processor 610 or user terminal 600, the processor 610 or computer to set a flag, single_layer_for_non_irap_flag, equal to 1 to indicate that there are at most two pictures from two different layers of a multi-layer video in each AU and when there are two pictures in a same AU the picture in a highest layer of the two different layers is an IRAP picture 22. The code means also causes the processor 610 or the user terminal 600 to signal, in an encoded bitstream corresponding to an encoded version of the multi-layer video, that every block of the IRAP picture is encoded as a skip block.

FIG. 23 also illustrates a computer program product 640 comprising computer readable code means and a computer program 630 according to above stored on the computer readable code means.

The software or computer program 630 may be realized as a computer program product 640, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Universal Serial Bus (USB), memory, a Hard Disk Drive (HDD) storage device, a flash memory, or any other conventional memory device. The computer program 630 may thus be loaded into the operating memory of the user terminal 600 or a computer for execution by the processor 610 thereof.

The computer or processing circuitry does not have to be dedicated to only execute the above-described steps, functions, procedure and/or blocks, but may also execute other tasks.

As indicated herein, the multi-layer or multi-view encoder may be defined as a group of function modules, where the function modules are implemented as a computer program running on a processor. The computer program residing in memory may thus be organized as appropriate function modules configured to perform, when executed by the processor, at least part of the steps and/or tasks described herein. An example of such function modules is illustrated in FIG. 21.

Figure 22:
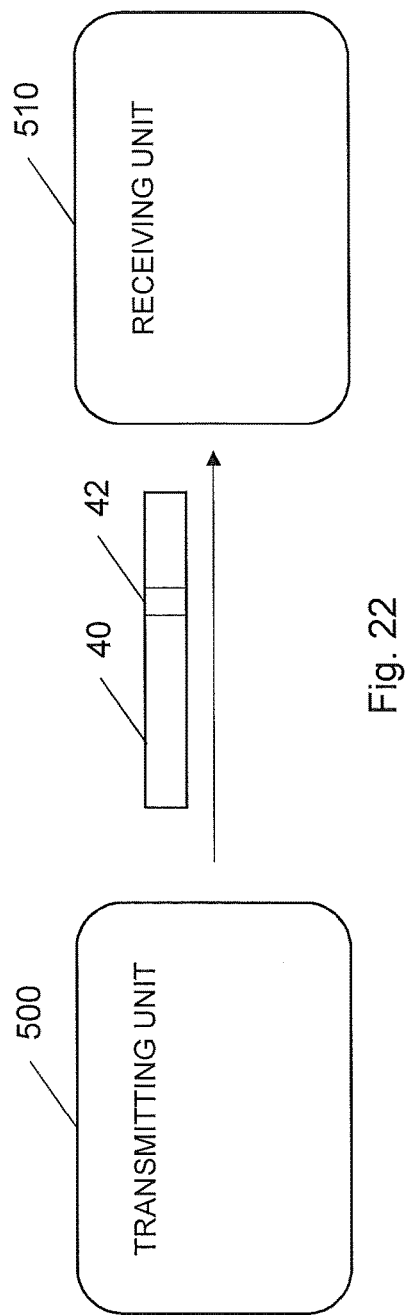
FIG. 22 schematically illustrates transmitting an encoded bitstream from a transmitting unit to a receiving unit.

The multi-layer or multi-view video encoder can be implemented in a transmitting unit 500 as shown in FIG. 22. The transmitting unit 500 can, for instance, be a video camera or a mobile device, such as a mobile telephone, a laptop, a tablet, etc. The transmitting unit 500 then transmits the encoded bitstream 40 corresponding to an encoded version of the multi-layer or multi-view video to a receiving unit 510, in which decoding and optionally also playback of the multi-layer or multi-view video can take place.

The embodiments apply to an encoder and any unit that can create or operate on, such as edit, a bitstream, including a network node, such as represented by a radio base station, or a Media Aware Network Element.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for encoding a multi-layer video comprising multiple layers, the method comprising:
   determining a switching point defining a switch from a second layer of the multi-layer video to a first layer of the multi-layer video;
   encoding, based on the switch being from the second layer to the first layer, a first picture in the first layer of the multi-layer video coinciding at the switching point to form an encoded first picture to be decoded by a decoder;
   encoding, based on the switch being from the second layer to the first layer, a second picture in the second layer of the multi-layer video coinciding at the switching point as a skip picture to form an encoded second picture to be skipped by the decoder, wherein the first picture in the first layer and the second picture in the second layer coinciding at the switching point represent different versions of a same original image; and
   transmitting a bit stream including the encoded first picture in the first layer and the encoded second picture in the second layer to the decoder, wherein the encoded first picture and encoded second picture represent the different versions of the same original image.

2. The method according to claim 1, wherein encoding the first picture in the first layer of the multi-layer video coinciding at the switching point comprises encoding the first picture in the first layer using at least one of a rate-distortion optimization, a fixed number of bits, and a fixed quality level, and/or wherein encoding the second picture in the second layer of the multi-layer video coinciding at the switching point comprises encoding the second picture in the second layer using at least one of a rate distortion optimization, a fixed number of bits, and a fixed quality level.

3. The method according to claim 1, further comprising identifying the switching point in the multi-layer video.

4. The method according to claim 1, further comprising encoding pictures in the second layer until reaching the switching point.

5. The method according to claim 4, further comprising encoding pictures in the first layer following the switching point.

6. The method according to claim 5, further comprising setting an output flag of the second picture in the second layer of the multi-layer video coinciding at the switching point to zero to indicate that the second picture in the second layer of the multi-layer video coinciding at the switching point is not to be output by the decoder.

7. The method according to claim 5, wherein encoding the second picture in the second layer of the multi-layer video coinciding at the switching point comprises encoding the second picture in the second layer of the multi-layer video coinciding at the switching point as a skip picture indicating that sample values are to be copied from a previous picture, according to an encoding and decoding order, of the multi-layer video or that resampled versions of the sample values are to be used.

8. The method according to claim 5, wherein encoding the second picture in the second layer of the multi-layer video coinciding at the switching point comprises encoding the second picture in the second layer of the multi-layer video coinciding at the switching point as a skip picture using a merge mode of High Efficiency Video Coding, HEVC.

9. The method according to claim 5, wherein encoding the first picture in the first layer of the multi-layer video coinciding at the switching point comprises encoding a picture in a base layer coinciding at the switching point of the multi-layer video; and
encoding the second picture in the second layer of the multi-layer video coinciding at the switching point comprises encoding a picture in an enhancement layer coinciding at the switching point of the multi-layer video as a skip picture.

10. The method according to claim 1, wherein each layer of the multi-layer video has a respective layer identifier, the method further comprising:
setting a flag, single_layer_for_non_irap_flag, equal to 1 to indicate that there are at most two pictures in each access unit, AU, and when there are two pictures in a same AU the picture in a highest layer is an Intra Random Access Point, IRAP, picture; and
signaling, in an encoded bitstream corresponding to an encoded version of the multi-layer video, that every block of the IRAP picture is encoded as a skip block.

11. The method according to claim 5, wherein the first picture in the first layer of the multi-layer video coinciding at the switching point and the second picture in the second layer of the multi-layer video coinciding at the switching point have a same picture order count, POC, value and belong to a same access unit, AU.

12. The method according to claim 1, wherein the different versions of the same original image are provided at different resolutions and/or quality levels.

13. The method according to claim 1, wherein the first layer and the second layer comprise different versions of a same video content but at different resolutions and/or quality levels.

14. A method for encoding a multi-layer video in which each layer of the multi-layer video has a respective layer identifier, the method comprising:
setting a flag, single_layer_for_non_irap_flag, equal to 1 to indicate that there are at most two pictures from two different enhancement layers of the multi-layer video in each access unit, AU, and when there are two pictures in a same AU the picture in a highest layer of the two different enhancement layers is an Intra Random Access Point, IRAP, picture, wherein the two pictures have a same picture order count, POC, wherein the IRAP picture is encoded without reference to any picture of a corresponding enhancement layer and prohibits subsequent pictures from the corresponding enhancement layer with a higher POC than the POC of the IRAP picture from being encoded with reference to other pictures from the corresponding enhancement layer with a lower POC than the POC of the IRAP picture; and
signaling, in an encoded bitstream corresponding to an encoded version of the multi-layer video, that every block of the IRAP picture is encoded as a skip block, wherein every block of the IRAP picture has the same POC.

15. A multi-layer video encoder configured to perform operations comprising:
determining a switching point defining a switch from a second layer of a multi-layer video to a first layer of the multi-layer video;
encoding, based on the switch being from the second layer to the first layer, a first picture in the first layer of the multi-layer video coinciding at the switching point to form an encoded first picture to be decoded by a decoder;
encoding, based on the switch being from the second layer to the first layer, a second picture in the second layer of the multi-layer video coinciding at the switching point as a skip picture to form an encoded second picture to be skipped by the decoder, wherein the first picture in the first layer and the second picture in the second layer coinciding at the switching point represent different versions of a same original image; and
transmitting a bit stream including the encoded first picture in the first layer and the encoded second picture in the second layer to the decoder, wherein the encoded first picture and encoded second picture represent the different versions of the same original image.

16. The multi-layer video encoder according to claim 15, further comprising:
a processor; and
a memory, wherein the processor is configured to perform operations comprising:
encoding the first picture in the first layer of the multi-layer video coinciding at the switching point; and
encoding the second picture in the second layer of the multi-layer video coinciding at the switching point as a skip picture.

17. The multi-layer video encoder according to claim 16, wherein the processor is further configured to perform operations comprising:
encoding the first picture in the first layer of the multi-layer video coinciding at the switching point using at least one of a rate-distortion optimization, a fixed number of bits, and a fixed quality level; and
encoding the second picture in the second layer of the multi-layer video coinciding at the switching point using at least one of a rate-distortion optimization, a fixed number of bits, and a fixed quality level.

18. The multi-layer video encoder according to claim 16, wherein the processor is further configured to perform operations comprising:
encoding pictures in the second layer until reaching the switching point.

19. The multi-layer video encoder according to claim 18, wherein the processor is further configured to perform operations comprising:
encoding pictures in the first layer following the switching point.

20. The multi-layer video encoder according to claim 19, wherein the processor is further configured to perform operations comprising:

identifying the switching point in the multi-layer video.

21. The multi-layer video encoder according to claim 19, wherein the processor is further configured to perform operations comprising:
setting an output flag of the second picture in the second layer of the multi-layer video coinciding at the switching point to zero to indicate that the second picture in the second layer of the multi-layer video coinciding at the switching point is not to be output by the decoder.

22. The multi-layer video encoder according to claim 19, wherein the processor is further configured to perform operations comprising:
encoding the second picture in the second layer of the multi-layer video coinciding at the switching point as a skip picture indicating that sample values are to be copied from a previous picture, according to an encoding and decoding order, of the multi-layer video or that resampled versions of the sample values are to be used.

23. The multi-layer video encoder according to claim 19, wherein the processor is further configured to perform operations comprising:
encoding the second picture in the second layer of the multi-layer video coinciding at the switching point as a skip picture using a merge mode of High Efficiency Video Coding, HEVC.

24. The multi-layer video encoder according to claim 19, wherein the processor is further configured to perform operations comprising:
encoding a picture in a base layer of the multi-layer video coinciding at the switching point; and
encoding a picture in an enhancement layer of the multi-layer video coinciding at the switching point as a skip picture.

25. The multi-layer video encoder according to claim 16, wherein each layer of the multi-layer video has a respective layer identifier, the processor is further configured to perform operations comprising:
setting a flag, single_layer_for_non_irap_flag, equal to 1 to indicate that there are at most two pictures in each access unit, AU, and when there are two pictures in a same AU the picture in a highest layer is an Intra Random Access Point, IRAP, picture; and
signaling, in an encoded bitstream corresponding to an encoded version of the multi-layer video, that every block of the IRAP picture is encoded as a skip block.

26. A multi-layer video encoder comprising:
a first encoding unit configured to encode first pictures, including a first picture, in a first layer of a multi-layer video comprising multiple layers up until a switching point to form an encoded first picture to be decoded by a decoder the switching point defining a switch between the first layer and a second layer in the multi-layer video;
a unit configured to determine a second picture in the second layer of the multi-layer video coinciding at the switching point to be encoded as a skip picture based on determining that the switch is from the second layer to the first layer, wherein a first picture of the first pictures in the first layer and the second picture in the second layer coinciding at the switching point represent different versions of a same original image but at different resolutions and/or quality levels;
a second encoding unit configured to encode the second picture as a skip picture to form an encoded second picture to be skipped by the decoder; and
an in/output unit configured to send an encoded bitstream corresponding to an encoded version of the multi-layer video including the encoded first picture in the first layer and the encoded second picture in the second layer to the decoder, wherein the encoded first picture and encoded second picture represent the different versions of the same original image.

27. A multi-layer video encoder comprising:
a first encoding unit configured to encode a first picture in a first layer of a multi-layer video coinciding at a switching point to form an encoded first picture to be decoded by a decoder, the switching point defining a switch between the first layer and a second layer in the multi-layer video;
a second encoding unit configured to encode the a-second picture in the second layer of the multi-layer video coinciding at the switching point as a skip picture based on determining that the switch is from the second layer to the first layer to form an encoded second picture to be skipped by the decoder, wherein the first picture in the first layer and the second picture in the second layer coinciding at the switching point represent different versions of a same original image but at different resolutions and/or quality levels; and
a transmission unit configured to transmit a bit stream including the encoded first picture in the first layer and the encoded second picture in the second layer to the decoder to decode the encoded first picture and to skip the encoded second picture, wherein the encoded first picture and encoded second picture represent the different versions of the same original image.

28. A multi-layer video encoder for encoding a multi-layer video in which each layer of the multi-layer video has a respective layer identifier, the multi-layer video encoder is configured to perform operations comprising:
setting a flag, single_layer_for_non_irap_flag, equal to 1 to indicate that there are at most two pictures from two different enhancement layers of the multi-layer video in each access unit, AU, and when there are two pictures in a same AU the picture in a highest layer of the two different enhancement layers is an Intra Random Access Point, IRAP, picture, wherein the two pictures have a same picture order count, POC, wherein the IRAP picture is encoded without reference to any picture of a corresponding enhancement layer and prohibits subsequent pictures from the corresponding enhancement layer with a higher POC than the POC of the IRAP picture from being encoded with reference to other pictures from the corresponding enhancement layer with a lower POC than the POC of the IRAP picture; and
signaling, in an encoded bitstream corresponding to an encoded version of the multi-layer video, that every block of the IRAP picture is encoded as a skip block, wherein every block of the IRAP picture has the same POC.

29. A transmitting unit comprising a multi-layer video encoder according to claim 15.

30. A computer program product comprising a non-transitory computer readable medium containing computer program code which when executed by a processor causes the processor to perform operations comprising:
determining a switching point defining a switch from a second layer of the multi-layer video to a first layer of the multi-layer video;
encoding a first picture in a first layer of a multi-layer video coinciding at a switching point to form an encoded first picture to be decoded by a decoder, the switching point defining a switch between the first layer and a second layer in the multi-layer video;

encoding a second picture in the second layer coinciding at the switching point as a skip picture based on determining that the switch is from the second layer to the first layer to form an encoded second picture to be skipped by the decoder, wherein the first picture in the first layer and the second picture in the second layer coinciding at the switching point represent different versions of a same original image; and transmitting a bit stream including the encoded first picture in the first layer and the encoded second picture in the second layer to the decoder, wherein the encoded first picture and encoded second picture represent different versions of the same original image.

31. The method of claim 1, wherein encoding the first picture in the first layer comprises encoding the first picture in a first enhancement layer, wherein encoding the second picture in the second layer comprises encoding the second picture in a second enhancement layer, wherein transmitting the bit stream comprises transmitting the encoded second picture to indicate to the decoder to skip the second picture in the second enhancement layer and decode the first picture in the first enhancement layer.

32. The method of claim 1, wherein encoding the first picture in the first layer comprises encoding the first picture in an enhancement layer to be decoded by the decoder, wherein encoding the second picture in the second layer comprises encoding the second picture in a base layer to be skipped by the decoder.

\* \* \* \* \*

UNITED STATES PATENT AND TRADEMARK OFFICE
CERTIFICATE OF CORRECTION

PATENT NO. : 10,404,987 B2
APPLICATION NO. : 14/390154
DATED : September 3, 2019
INVENTOR(S) : Samuelsson et al.

It is certified that error appears in the above-identified patent and that said Letters Patent is hereby corrected as shown below:

In the Specification

In Column 1, Line 30, delete "(Infra)" and insert -- (Intra) --, therefor.

In Column 1, Line 32, delete "Infra" and insert -- Intra --, therefor.

In Column 10, Line 63, delete "i.e," and insert -- i.e. --, therefor.

In Column 11, Line 28, delete "e.g," and insert -- e.g. --, therefor.

In Column 13, Line 10, delete "i.e," and insert -- i.e. --, therefor.

In Column 13, Line 24, delete "addition," and insert -- additional, --, therefor.

In Column 18, Line 43, delete "were" and insert -- where --, therefor.

In Column 18, Line 46, delete "were" and insert -- where --, therefor.

In Column 19, Line 20, delete "1," and insert -- 1. --, therefor.

In Column 20, Line 33, delete "i.e," and insert -- i.e. --, therefor.

In Column 22, Line 48, delete "single_layer for non_irap_flag" and insert
-- single_layer_for_non_irap_flag --, therefor.

In Column 23, Line 29, delete "second encoding unit 410" and insert -- second encoding unit 420 --, therefor.

Signed and Sealed this
Seventh Day of April, 2020

Andrei Iancu
*Director of the United States Patent and Trademark Office*

CERTIFICATE OF CORRECTION (continued)
U.S. Pat. No. 10,404,987 B2

In the Claims

In Column 26, Line 55, in Claim 2, delete "rate distortion" and insert -- rate-distortion --, therefor.

In Column 29, Line 51, in Claim 26, delete "decoder" and insert -- decoder, --, therefor.

In Column 30, Line 14, in Claim 27, delete "the a-second" and insert -- the second --, therefor.